(12) United States Patent
Jin et al.

(10) Patent No.: US 11,656,658 B2
(45) Date of Patent: May 23, 2023

(54) ELECTRONIC DEVICE AND METHOD FOR CONTROLLING ELECTRONIC DEVICE

(71) Applicant: Samsung Electronics Co., Ltd., Gyeonggi-do (KR)

(72) Inventors: Seoyoung Jin, Gyeonggi-do (KR); Shinyoung Na, Gyeonggi-do (KR); Wonhee Lee, Gyeonggi-do (KR); Oheon Kwon, Gyeonggi-do (KR); Jeongmin Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 61 days.

(21) Appl. No.: 17/170,206

(22) Filed: Feb. 8, 2021

(65) Prior Publication Data

US 2021/0247812 A1 Aug. 12, 2021

(30) Foreign Application Priority Data

Feb. 10, 2020 (KR) ........................ 10-2020-0015960

(51) Int. Cl.
*G06F 1/16* (2006.01)
*G06F 3/14* (2006.01)
(Continued)

(52) U.S. Cl.
CPC .......... *G06F 1/1677* (2013.01); *G06F 1/1641* (2013.01); *G06F 1/1686* (2013.01); *G06F 21/32* (2013.01); *G06F 21/84* (2013.01)

(58) Field of Classification Search
CPC ... G09G 5/00; G09G 5/14; G09G 5/38; G06F 1/16; G06F 1/26; G06F 1/32;
(Continued)

(56) References Cited

U.S. PATENT DOCUMENTS 10,078,348 B1 9/2018 Xu et al.
10,719,105 B2 7/2020 Seo et al.
(Continued)

FOREIGN PATENT DOCUMENTS

KR 10-1847047 4/2018
KR 10-1942950 1/2019
WO WO 2019/019883 1/2019

OTHER PUBLICATIONS

International Search Report dated May 28, 2021 issued in counterpart application No. PCT/KR2021/001368, 8 pages.
(Continued)

*Primary Examiner* — Chanh D Nguyen
*Assistant Examiner* — Nguyen H Truong
(74) *Attorney, Agent, or Firm* — The Farrell Law Firm, P.C.

(57) ABSTRACT

An electronic device is provided, which includes a first housing and a second housing, a first sensor, a second sensor, a display, a first processor, and a second processor. The first processor is configured to obtain, via the first sensor, first information about movement of the electronic device, obtain, via the second sensor, second information about the movement of the electronic device, determine a type of the movement of the electronic device based on the first information and/or the second information, determine an arrangement state of the electronic device, based on a comparison of the first information and the second information, and control the second processor based on the determined type of the movement and the determined arrangement state of the electronic device. The second processor is configured to perform a specified operation based on the command.

17 Claims, 15 Drawing Sheets

(51) Int. Cl.
*G06F 21/32* (2013.01)
*G06F 21/84* (2013.01)

(58) Field of Classification Search
CPC .... G06F 1/1641; G06F 1/1677; G06F 1/1686;
G06F 3/0346; G06F 3/041; G06F 3/14;
G06F 3/20; G06F 21/31; G06F 21/32;
G06F 21/34; G06F 21/36; G06F 21/84;
G06K 9/00; H01L 27/32
See application file for complete search history.

(56) References Cited

U.S. PATENT DOCUMENTS

| | | | |
|---|---|---|---|
| 2013/0205142 | A1 | 8/2013 | Jung |
| 2015/0338888 | A1 | 11/2015 | Kim et al. |
| 2016/0381014 | A1 | 12/2016 | Kim |
| 2017/0016720 | A1 | 1/2017 | Choi et al. |
| 2017/0017313 | A1* | 1/2017 | Rakshit .................. G09G 3/035 |
| 2017/0075640 | A1 | 3/2017 | Chun et al. |
| 2019/0033928 | A1* | 1/2019 | Seo ....................... G06F 3/0346 |
| 2019/0056844 | A1 | 2/2019 | Kang et al. |
| 2019/0310720 | A1 | 10/2019 | Angelevski et al. |
| 2019/0370448 | A1* | 12/2019 | Devine ................. G06F 21/316 |
| 2020/0012324 | A1 | 1/2020 | Sung et al. |
| 2020/0029609 | A1 | 1/2020 | Sato |
| 2020/0296096 | A1 | 9/2020 | Kim |

OTHER PUBLICATIONS

European Search Report dated Jun. 29, 2021 issued in counterpart application No. 21155822.6-1216, 11 pages.
EP Intention to Grant dated Oct. 28, 2022 issued in counterpart application No. 21155822.6-1224, 7 pages.

\* cited by examiner

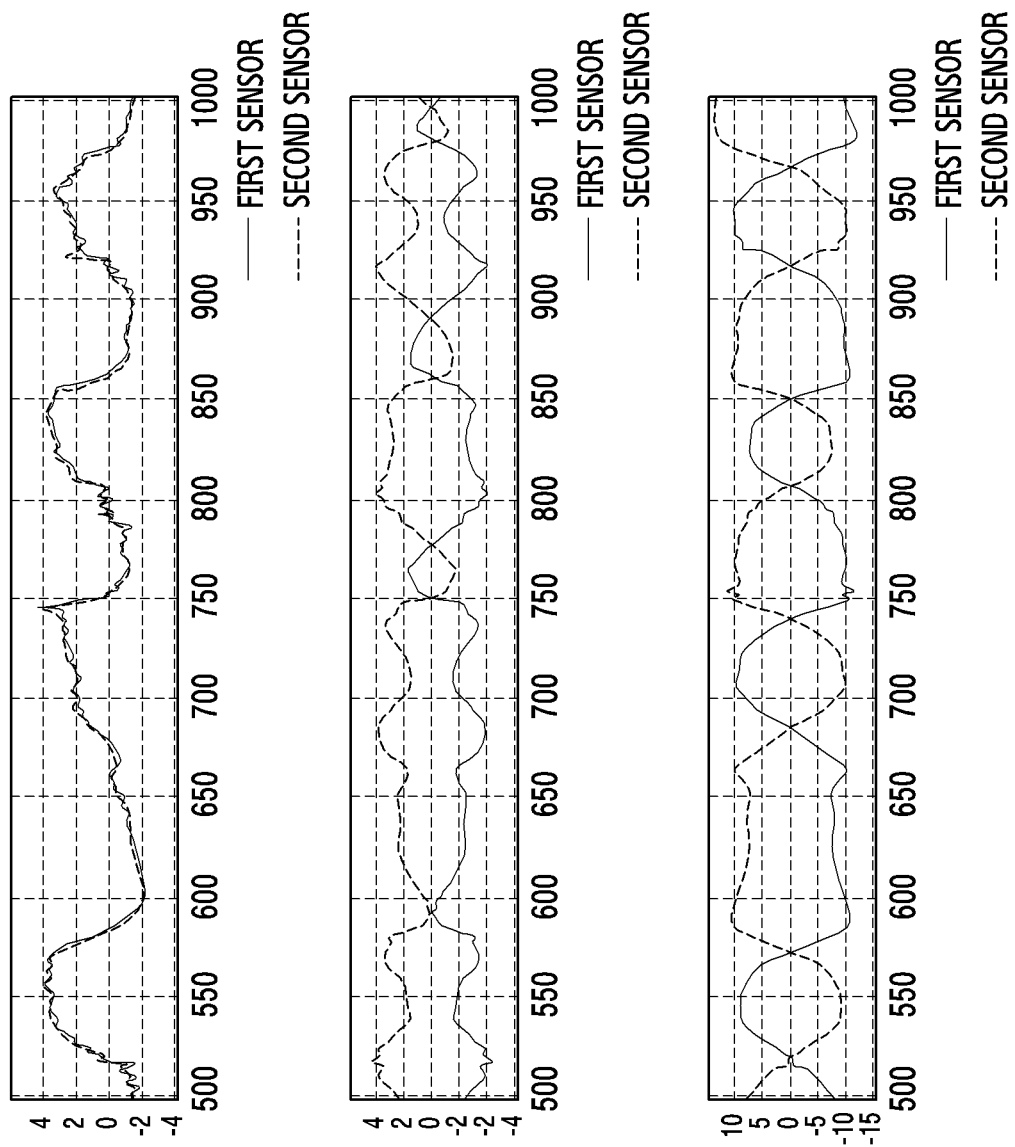

ELECTRONIC DEVICE AND METHOD FOR CONTROLLING ELECTRONIC DEVICE

CROSS-REFERENCE TO RELATED APPLICATION(S)

This application is based on and claims priority under 35 U.S.C. § 119 to Korean Patent Application No. 10-2020-0015960, which was filed in the Korean Intellectual Property Office on Feb. 10, 2020, the entire disclosure of which is incorporated herein by reference.

BACKGROUND

1. Field

The disclosure relates generally to an electronic device and a method for controlling the electronic device based on the movement and arrangement state of the electronic device.

2. Description of Related Art

Development of display technologies has been followed by development of various display devices, such as flexible display devices and transparent display devices. Users may use flexible display devices in folded or unfolded states, and the volume of the electronic devices can thus be reduced.

Flexible display devices may be implemented as organic electroluminescent display devices, liquid crystal display (LCD) devices, etc. For example, organic substrates and flexible materials (e.g., plastic films) may be used to manufacture foldable electronic devices.

Unlike conventional electronic devices, a foldable electronic device may have multiple arrangement states according to the folding angle, and it may be difficult to perform consistent operations according to the motion of the electronic device. Therefore, the foldable electronic device may need to identify motion and an arrangement state of the foldable electronic device, and may need to determine whether or not to turn the screen on and which function is to be controlled, according to the identified motion and arrangement state.

Foldable electronic devices have hinge portions and thus have a relatively smaller sized battery than similar sized non-foldable electronic devices. Further, if an auxiliary display is added, a larger amount of current is inevitably consumed.

As a result, a need a exists for a solution for improving power consumption. Further, a need exists for a method for efficiently controlling a foldable electronic device such that battery usage is adjusted according to an activation state (e.g., a sleep mode or an active mode) of the foldable electronic device.

SUMMARY

The disclosure has been made to address at least the disadvantages described above and to provide at least the advantages described below.

An aspect of the disclosure is to provide an electronic device configured such that a type of movement and/or an arrangement state of a foldable electronic device is determined from information regarding movement of the foldable electronic device, and a command (or a signal) for controlling an application processor is provided, based on the same.

In accordance with an aspect of the disclosure, an electronic device is provided, which includes a housing including a first housing and a second housing rotatably connected to the first housing; a first sensor disposed in the first housing; a second sensor disposed in the second housing; a display disposed across the first housing and the second housing; a first processor; and a second processor. The first processor is configured to obtain, via the first sensor, first information about movement of the electronic device, obtain, via the second sensor, second information about the movement of the electronic device, determine a type of the movement of the electronic device based on at least one of the first information or the second information, determine an arrangement state of t electronic device associated with an angle formed by the first housing and the second housing of the electronic device, based on a comparison of the first information and the second information, and provide a command to control the second processor based on the determined type of the movement of the electronic device and the determined arrangement state of the electronic device. The second processor is configured to perform a specified operation based on the command.

In accordance with another aspect of the disclosure, a method is provided for controlling an electronic device including a first housing and a second housing. The method includes obtaining first information about movement of the electronic device using a first sensor disposed in the first housing; obtaining second information about the movement of the electronic device using a second sensor disposed in the second housing; determining a type of the movement of the electronic device based on at least one of the first information or the second information; determining an arrangement state of the electronic device associated with an angle formed by the first housing and the second housing of the electronic device based on a comparison of the first information and the second information; and providing a command to control an application processor (AP) based on the determined type of the movement of the electronic device and the determined arrangement state of the electronic device.

In accordance with another aspect of the disclosure, an electronic device is provided, which includes a housing including a first housing and a second housing rotatably connected to the first housing; a first sensor disposed in the first housing; a second sensor disposed in the second housing; a camera for user authentication; a first processor; and a second processor. The first processor is configured to obtain, via the first sensor, first information about movement of the electronic device, obtain, via the second sensor, second information about the movement of the electronic device, determine a type of the movement of the electronic device based on at least one of the first information or the second information, determine an arrangement state of the electronic device associated with an angle formed by the first housing and the second housing based on a comparison of the first information and the second information, and provide a command to control the second processor based on the determined type of the movement of the electronic device and the determined arrangement state of the electronic device. The second processor is configured to perform a specified operation based on the command.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13A is a graph illustrating a sensing data signal on an x-axis detected by a sensor when an electronic device is in a folded state according to an embodiment;

FIG. 13B is a graph illustrating a sensing data signal on a y-axis detected by a sensor when an electronic device is in a folded state according to an embodiment;

FIG. 13C is a graph illustrating a sensing data signal on a z-axis detected by a sensor when an electronic device is in a folded state according to an embodiment;

DETAILED DESCRIPTION

Figure 1:
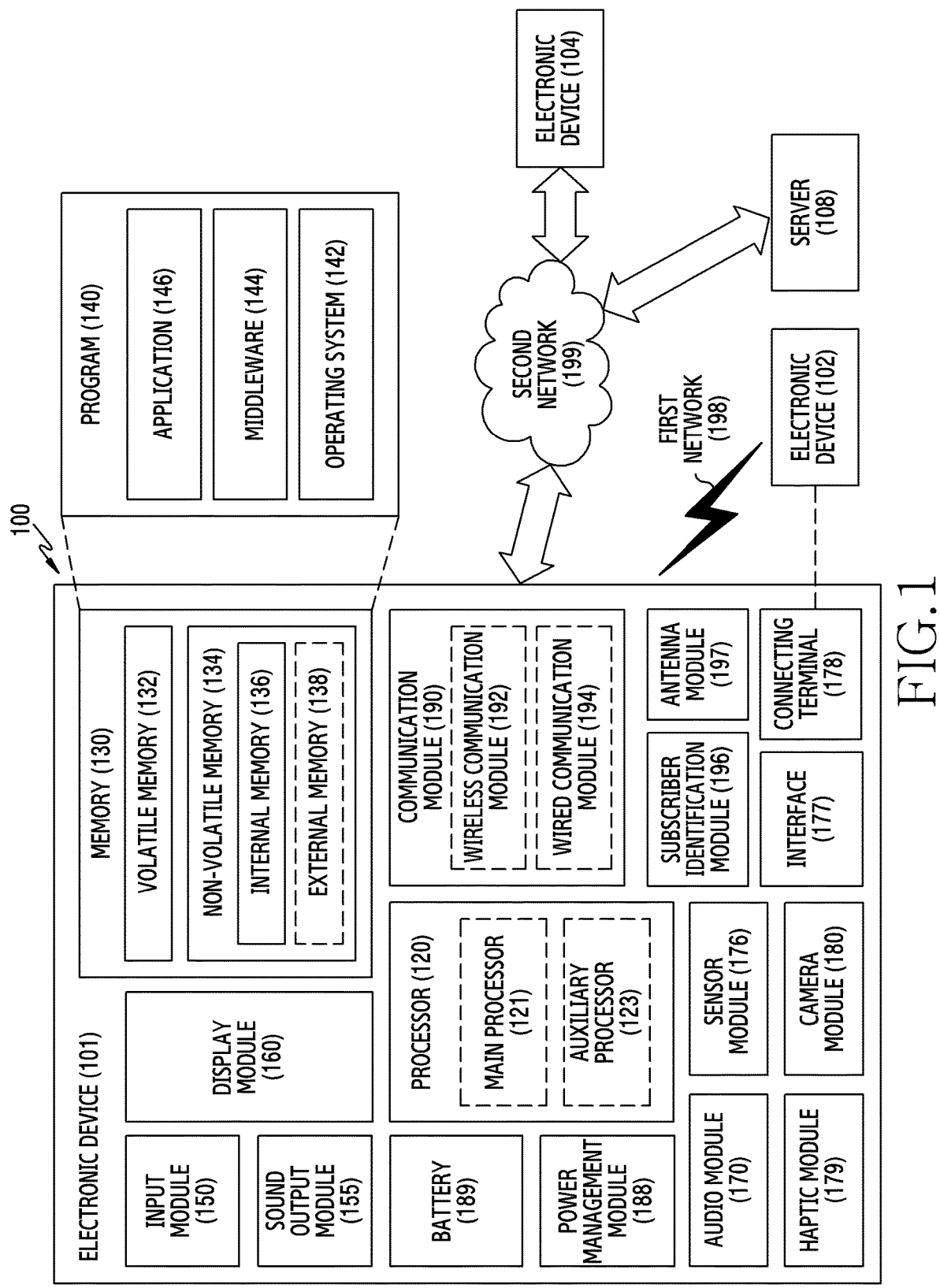
FIG. 1 illustrates an electronic device in a network environment according to an embodiment.

Hereinafter, various embodiments of the disclosure will be described with reference to the accompanying drawings.

In the following description, specific details such as detailed configuration and components are merely provided to assist the overall understanding of these embodiments. Therefore, various changes and modifications of the embodiments described herein can be made without departing from the scope and spirit of the disclosure. In addition, descriptions of well-known functions and constructions are omitted for clarity and conciseness.

For convenience of description, the sizes of components illustrated in the drawings may be exaggerated or reduced, and the disclosure is not necessarily limited to those illustrated. Additionally, the same or similar reference numerals may be used to indicate like or similar components in the drawings.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197, in some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an AP), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various data used by at least one component the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional (FD)-MIMO, array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface, and capable of supporting a designated high-frequency band (e.g., the mmWave band), and a plurality of antennas (e.g., array antennas) disposed on a second surface (e.g., the top or a side surface) of the printed circuit board, or adjacent to the second surface, and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPM), serial peripheral interface (SPI), or mobile industry processor interface (MIDI)).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component, in such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
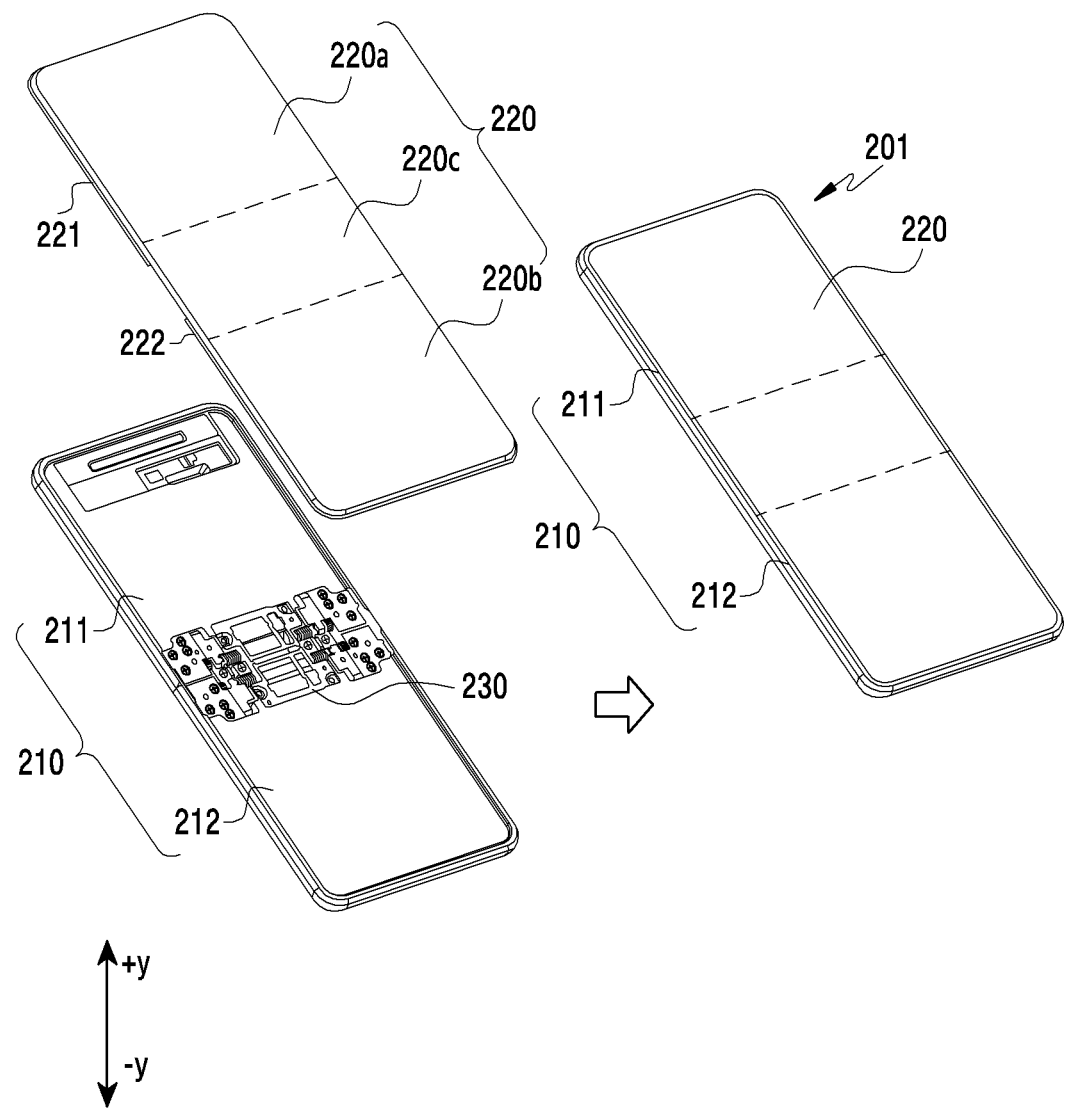
FIG. 2 illustrates an exploded diagram of an electronic device in an unfolded state according to an embodiment.
Figure 3:
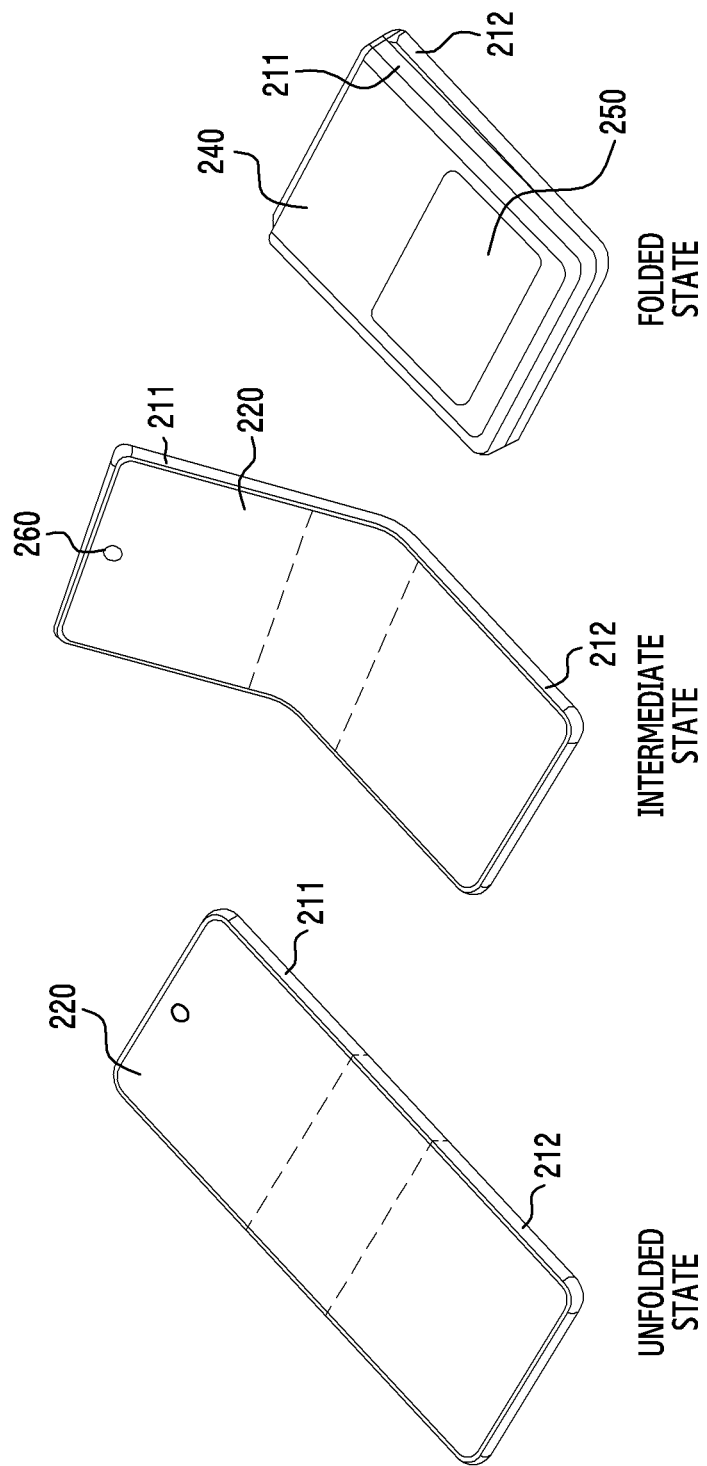
FIG. 3 illustrates an electronic device in an unfolded state, an intermediate state, and a folded state according to an embodiment.

FIG. 2 illustrates an exploded diagram of an electronic device in an unfolded state according to an embodiment. FIG. 3 illustrates an electronic device in an unfolded state, an intermediate state, and a folded state according to an embodiment.

Referring to FIGS. 2 and 3, the electronic device 201 includes a foldable housing 210 including a first housing 211 and a second housing 212, a flexible display 220, a hinge assembly 230, a cover 240, and an auxiliary display 250.

The first housing 211 and the second housing 212 may form a space in which electronic components (e.g., a PCB, a battery, and a processor) of the electronic device 201 may be disposed and may form a lateral side of the electronic device 201. Various types of components for performing various functions of the electronic device 101 may be disposed in the first housing 211 and the second housing 212. For example, electronic components, such as a camera, a receiver, a sensor, and a processor may be disposed inside the first housing 211 and the second housing 212. The electronic components may be exposed on a front surface of the electronic device 201 through at least one opening or recess provided on the flexible display 220. For convenience of description, the surface on which the flexible display 220 is disposed is referred to herein as a front surface, and the opposite side is referred to as a rear surface.

The first housing 211 and the second housing 212 may be disposed parallel with each other on the same surface when the electronic device 101 is in an unfolded state. When the electronic device 1011 is in a folded state, one surface of the first housing 211 may be disposed to face one surface of the second housing 212. When the electronic device 101 is in an intermediate state, the first housing 211 and the second housing 212 may be disposed to form an angle therebetween. The first housing 211 or the second housing 212 may rotate (or revolve) about the hinge assembly 230 to be folded or unfolded.

The folded state, the unfolded state, and the intermediate state may be defined by an angle formed by the first housing 211 and the second housing 212.

For example, the unfolded state may be defined as a state in which the first housing 211 and the second housing 212 form a first threshold angle (e.g., about 170 degrees) or greater, the folded state may be defined as a state in which the first housing 211 and the second housing 212 form an angle less than a second threshold angle (e.g., 30 degrees or less), and the intermediate state may be defined as a state in which the first housing 211 and the second housing 212 form an angle between the first threshold angle and the second threshold angle (e.g., between 60 degrees to 120 degrees). The intermediate state may have a plurality of stages (or sections), e.g., a first intermediate state (45 degrees to 90 degrees) and a second intermediate state (90 degrees to 135 degrees).

The first housing 211 and the second housing 212 may form a recess for accommodating the flexible display 220, and the flexible display 220 may be seated in the recess to be supported by the first housing 211 and the second housing 212. The flexible display 220 may be supported by a first support plate 221 and/or a second support plate 222 positioned between the flexible display 220 and the first housing 211 and the second housing 212. The first housing 211 and the second housing 212 may be formed of a metallic material and/or a nonmetallic material having a specified rigidity to support the flexible display 220.

The flexible display 220 may be disposed on the first housing 211 and the second housing 212, and may form the front surface of the electronic device 201 (e.g., a surface in a +y, direction in FIG. 2) when the electronic device 201 is in the unfolded state. The flexible display 220 may be disposed to extend from one area of the first housing 211 to at least one area of the second housing 212 through the hinge assembly 230. The flexible display 220 may be seated in the recess formed by the first housing 211 and the second housing 212 to be disposed on the first housing 211 and the second housing 212.

The flexible display 220 includes a first area 220a corresponding to at least one area of the first housing 211, a second area 220b corresponding to at least one area of the second housing 212, and a folding area 220c positioned between the first area 220a and the second area 220b and having a characteristic of being flexible. However, the flexible display 220 is not limited to the foregoing example. The first area 220a, the folding area 220c, and the second area 220h may be disposed parallel with each other in the same direction (e.g., the +y direction in FIG. 2) when the electronic device 201 is in the unfolded state. When the electronic device 201 is in the folded state, the folding area 220c may be folded so that the first area 220a and the second area 220b face each other.

At least one area of the flexible display 220 (e.g., the first area 220a) may be attached to one surface of the first housing 211, and another area (e.g., the second area 220b) may be attached to one surface of the second housing 212. The flexible display 220 may be attached to one surface of the first housing 211 and one surface of the second housing 212 through the support plates 221 and 222 positioned between the flexible display 220 and the first housing 211 or between the flexible display 220 and the second housing 212.

The support plates 221 and 222 may include a first support plate 221 attached to at least one area of the first housing 211 to support the first area 220a of the flexible display 220 and a second support plate 222 attached to at least one area of the second housing 212 to support the second area 220h of the flexible display 220. The first support plate 221 may be attached to at least a portion of the first area 220a of the flexible display 220 to support the flexible display 220. Likewise, the second support plate 222 may be attached to at least a portion of the second area 220h of the flexible display 220 to support the flexible display 220. The first support plate 221 and the second support plate 222 may be formed of a material having rigidity to support the flexible display 220.

The hinge assembly 230 may connect the first housing 211 and the second housing 212. The second housing 212 may rotate about the hinge assembly 230 with respect to the first housing 211 within a specified rotation range, and vice versa.

The hinge assembly 230 includes a hinge housing and may be coupled to the foldable housing 210. The hinge housing may be exposed outside the electronic device 201 or may be covered by the foldable housing 210 according to state of the electronic device 201. When the electronic device 201 is in the unfolded state, the hinge housing may be covered by the foldable housing 210 and may thus not be exposed outside the electronic device 201. However, when the electronic device 201 is in the folded state (, the hinge housing may be exposed outside the electronic device 201 due to rotation of the first housing 211 and the second housing 212. When the electronic device 201 is in the intermediate state, the hinge housing may be partially exposed outside the electronic device 201 between the first housing 211 and the second housing 212. A portion of the hinge housing exposed outside the electronic device 201 when the electronic device 201 is in the intermediate state may be smaller than a portion thereof exposed when the electronic device 201 is in the fully folded state.

As illustrated in FIG. 3, the cover 240 may be disposed on the rear surfaces of the first housing 211 and the second housing 212 to form the rear surface of the electronic device 201. The cover 240 may include a first cover disposed on the first housing 211 and a second cover disposed on the second housing 212. The first cover and the first housing 211 may be integrally formed, and the second cover and the second housing 212 may be integrally formed.

The auxiliary display 250 may be disposed on the cover 240, i.e., the rear surface of the electronic device 201. The auxiliary display 250 may be disposed on one surface of the cover 240 on the first housing 211, may be disposed on one surface of the cover 240 on the second housing 212, or may be disposed on the cover 240 across the first housing 211 and the second housing 212. However, the auxiliary display 250 is not limited to the foregoing embodiment and may also be formed to have flexibility like the flexible display 220.

The front surface of the electronic device 201 may include the flexible display 220, the first support plate 221 and the second support plate 222 that support the flexible display 220 at the edge of the flexible display 220, a portion of the first housing 211 adjacent to the flexible display 220, and a portion of the second housing 212 adjacent to the flexible display 220. The rear surface of the electronic device 201 may include the cover 240, a portion of the first housing 211 adjacent to the cover 240, and a portion of the second housing 212 adjacent to the cover 240.

Hereinafter, an arrangement state (e.g., an unfolded state, an intermediate state, and a folded state) of the electronic device 201 associated with an angle formed by the first housing 211 and the second housing 212 and a relationship between the first housing 211 and the second housing 212 according to the arrangement state will be described using FIG. 3.

Referring to FIG. 3, when the electronic device 201 is in the unfolded state, the first housing 211 and the second housing 212 may form an angle of substantially 180 degrees and may be disposed in the same direction. The surface of the first area 220a of the flexible display 220 and the surface of the second area 220b of the flexible display 220 may form 180 degrees and ma face the same direction (e.g.; the direction of the front surface of the electronic device). Likewise, when the electronic device 201 is in the unfolded state, the first support plate 221 and the second support plate 222 may also face the same direction. In the unfolded state, the surface of the first area 220a of the flexible display 220 and the surface of the second area 220b of the flexible display 220 may be disposed to form an angle close to 180 degrees (e.g., 175 degrees) although not forming exactly 180 degrees.

In the unfolded state, the electronic device 201 may display more detailed content on the flexible display 220 than displayed on the auxiliary display 250 in the folded state.

When the electronic device 201 is in the intermediate state, the first housing 211 and the second housing 212 may be disposed to form a certain angle. Likewise, when the electronic device 201 is in the intermediate state, the first support plate 221 and the second support plate 222 may also be disposed to form a certain angle. The surface of the first area 220a of the flexible display 220 and the surface of the second area 220b of the flexible display 220 may form an angle that is greater than that in the folded state and is less than that in the unfolded state. The folding area 220c of the flexible display 220 may have at least a portion of a curved surface having a certain curvature, and the curvature in this state may be less than that in the folded state.

When in the intermediate state, the electronic device 201 may operate in a tabletop mode. When the electronic device 201 is in the intermediate state, a screen area displayed on the flexible display 220 of the electronic device 201 may be divided based on a rotation axis. Thus, the tabletop mode may include an operation of displaying an application being executed based on the divided screen area when the electronic device 201 is in the intermediate state. When the electronic device 201 is in the intermediate state and the second area 220b corresponding to the second housing 212 lying (or placed) on a surface, the second area 220b of the flexible display 220 may be utilized as a first user interface (UI) area and the first area 220a may be utilized as a second UI area, thereby displaying different UIs. For example, an input interface (e.g., a virtual keyboard UI) may be displayed in the first UI area, and a UI of the application being executed may be displayed in the second UI area, thereby controlling the application being displayed in the second UI area based on an input (e.g., touch input) received via the first area. Alternatively, an input interface (e.g., a shooting button of a camera application) of the application being executed may be displayed in the first UI area, and a different interface (e.g., a preview UI) of the application being executed may be displayed in the second UI area. As another example, in a standby state, a UI, such as a clock UI or a notification UI may be displayed in an always-on-display (AOD) mode in the second UI area. The first UI area may further include a UI area corresponding to at least part of the folding area 220c (e.g., half an area in the direction of the ground), and the second UI area may further include a UI area corresponding to the remaining part of the folding area 220c.

When the electronic device 201 is in the intermediate state, the electronic device 201 may be placed on a surface such that the second housing 212 lays flat on the surface and the first housing 211 is elevated off of the surface, without using a separate fixing device or without the user holding the electronic device 201. Accordingly, convenience in use may be provided for the user (e.g., when using a camera with both hands free, during a video call, or when personal broadcasting).

When the electronic device 201 is in the folded state, the first housing 211 and the second housing 212 may face each other. When the electronic device 201 is in the folded state, the surface of the first area 220a of the flexible display 220 and the surface of the second area 220b thereof may face each other. In the folded state, the surface of the first area. 220a of the flexible display 220 and the surface of the second area 220b of the flexible display 220 may form an angle (e.g., 10 degrees of less) close to 0 degrees. Here, the folding area 220c of the flexible display 220 may have at least a portion of a curved surface having a certain curvature, and the curvature in this state may be greater than that in the intermediate state.

When the electronic device 201 is in the folded state, the first area 220a of the flexible display 220 and the second area 220b of the flexible display 220 may not be in direct contact due to a protection member. When the first area 220a and the second area 220h come in direct contact with each other, friction may occur between the first area 220a, and the second area 220b of the flexible display 220 by an external impact (e.g., a fall). The friction occurring between the first area 220a and the second area 220b may damage the surface of the first area 220a and/or the second area 220b. Accordingly, the electronic device 201 does not allow the first area 220a and the second area 220b to come into contact with each other through the protection member, thus preventing a portion of the flexible display 220 from being damaged by an external impact.

When the electronic device 201 is in the folded state, input/output may be possible through the auxiliary display 250 disposed on the rear surface of the electronic device 201. In the folded state, it is possible to protect the flexible display 220 of the electronic device 201, while still identifying information, such as an alarm or a message, through the auxiliary display 250. The user may unfold the electronic device 201 in the folded state to identify more details regarding the message. When a state change from the folded state to the unfolded state is detected, the electronic device 201 may output detailed information about the message output in a summary on the display 220.

The folded state may be further divided according to the angle formed by the first housing 211 and the second housing 212 of the electronic device 201. For example, the folded state may be divided into different arrangement states classified according to whether the angle formed by the first housing 211 and the second housing 212 is greater than 90 degrees.

Although the foregoing arrangement states of the electronic device 201 have been described with reference to embodiments in which the electronic device 201 is folded in a horizontal direction, the disclosure is not limited to this example. For example, an electronic device according to another embodiment may be folded in a vertical direction based on a virtual folding axis extending in the vertical direction.

Figure 4:
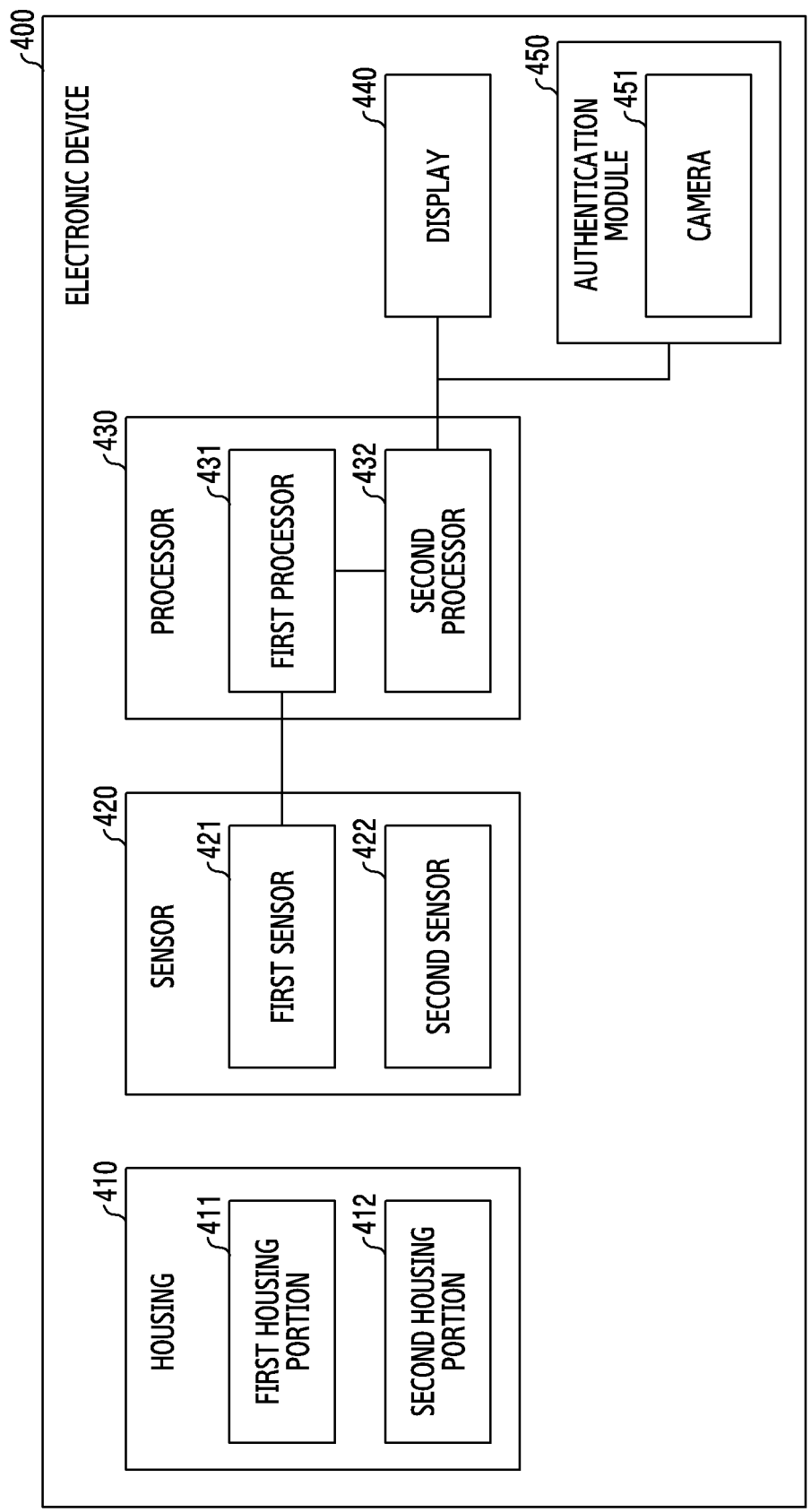
FIG. 4 illustrates an electronic device according to an embodiment.

FIG. 4 illustrates an electronic device according to an embodiment.

Referring to FIG. 4, the electronic device 400 includes a housing 410, a sensor 420, a processor 430, a display 440, and an authentication module 450. Although not shown, the electronic device 400 may include other elements such as a memory, a battery; a communication circuit, etc. The housing 410 includes a first housing portion 411 and a second housing portion 412. The sensor 420 includes a first sensor 421 and a second sensor 422. The processor 430 includes a first processor 431 and a second processor 432. The authentication module 450 includes a camera 451 for user authentication.

The first housing portion 411 and the second housing portion 412 may rotatably connected to each other.

Although illustrated as merely being included in the sensor 420 within the electronic device 400, the first sensor 421 may be disposed in the first housing portion 411, and the second sensor 422 may be disposed in the second housing portion 412. Similarly, the display 440 may be disposed across the first housing portion 411 and the second housing portion 412. The first processor 431 may be electrically or operatively connected to the first sensor 421 and the second sensor 422, and the second processor 432 may be electrically or operatively connected to the first processor 431 and the display 440.

The housing 410 may form the exterior of the electronic device 400 and may include a space in which constituent components of the electronic device 400 may be disposed. The housing 410 may be divided into the first housing portion 411 and the second housing portion 412 based on a folding axis at which the electronic device 400 is folded.

The sensor 420 may include an accelerometer, a gyro sensor, a geomagnetic sensor, and/or a hall sensor. The accelerometer may sense information about a linear movement of the electronic device 400 and/or acceleration of the electronic device 400 with respect to three axes. The gyro sensor may sense information about rotation of the electronic device 400, and the geomagnetic sensor may sense information about a direction in which the electronic device 400 looks in an absolute coordinate system. The hall sensor may be a magnetic sensor and may be disposed in a hinge area of the electronic device 400 or a contact area when the electronic device 400 is folded. The hall sensor may include a digital hall sensor such as a geomagnetic sensor and may determine whether the electronic device 400 is folded or unfolded and folding or unfolding information (e.g., a folded angle) by detecting a change in magnetic field due to magnetism. The hall sensor may be supplementarily or additionally used along with the accelerometer; the gyro sensor, and/or the geomagnetic sensor to determine the movement type and/or arrangement state of the electronic device 400.

The sensor 420 may a sensor for measuring a movement and a sensor that generates an electrical signal or data value corresponding to an internal operating state of the electronic device 400 or an external environmental condition, e.g., at least one of a battery level detection sensor, a pressure sensor, an optical sensor, a temperature sensor, and a biometric sensor.

The first sensor 421 may be disposed in the first housing portion 411 and the second sensor 422 may be disposed in the second housing portion 412, such that first information and second information about a movement of the electronic device 400 may be obtained using the first sensor 421 and the second sensor 422, respectively. The first sensor 421 may include a first inertial sensor (e.g., an accelerometer or a gyro sensor) for detecting movement corresponding to a plurality of axes (e.g., an x-axis, a y-axis, and a z-axis), and the second sensor 422 may include a second inertial sensor (e.g., an accelerometer or a gyro sensor) for detecting movement corresponding to at least the plurality of axes. The first sensor 421 and the second sensor 422 may be the same type of sensor or may be different types of sensors, and the second sensor 422 may detect motion data corresponding to more axes than those detectable by the first sensor 421. For example, when the first sensor 421 is a six-axis sensor, the second sensor 422 may be a nine-axis sensor.

The first information may include first sensing data corresponding to the plurality of axes detected by the first inertial sensor, and the second information may include second sensing data corresponding to the plurality of axes detected by the second inertial sensor.

An inertial sensor, such as an accelerometer, may be used to measure the acceleration of a moving object or the strength of an impact and may process a measured acceleration signal to estimate force (vector) applied to the first housing portion 411 or the second housing portion 412 in which the accelerometer is disposed. When the electronic device 400 does not move, a value corresponding to acceleration of gravity may be sensed, and when the electronic device 400 moves, a value corresponding to variance in acceleration in a corresponding direction may be sensed.

The processor 430 may include a hardware module or a generic processor configured to execute software (e.g., an application program). The processor 430 may control a hardware component (function) or a software component (program) including at least one of various sensors included in the electronic device 400, a data measurement module, an input/output interface, a module for managing the state or environment of the electronic device 400, and a communication module.

The first processor 431 may obtain the first information about the movement of the electronic device 400 using the first sensor 421 and may obtain the second information about movement of the electronic device 400 using the second sensor 422. The first processor 431 may determine the type of the movement of the electronic device 400 based on the first information or the second information. Alternatively, the processor 430 may determine an arrangement state (e.g., an unfolded state, an intermediate state, or a folded state) of the electronic device 400 associated with an angle formed by the first housing portion 411 and the second housing portion 412 of the electronic device 400 based on a result of comparing the first information and the second information. The processor 430 may increase accuracy in determining the type of the movement and/or the arrangement state of the electronic device 400 supplementarily or additionally using data obtained from the hall sensor. The processor 430 may generate a command (or control signal) based on the determined type of the movement of the electronic device 400 and the determined arrangement state of the electronic device 400.

The first processor 431 may control the sensor 420 of the electronic device 400, may obtain information about the movement of the electronic device 400 obtained by the sensor 420, and may calculate a result value (e.g., the type of the movement of the electronic device 400 or the arrangement state of the electronic device 400) by analyzing the obtained information. The first processor 431 may transmit a command (or signal) to control (e.g., activate, wake up, or authenticate) the second processor 432 to the second processor 432 based on the result value. The first processor 431 may always be activated, and the second processor 432 may be selectively activated, e.g., according to a control command from the first processor 431.

The second processor 432 may control the operation of an application (or program), and may enter a sleep inactive) state when not used (e.g., when no input is received from a user) for a specified time (e.g., 30 seconds) or longer. The second processor 432 may be activated when receiving a control command (e.g., a wake-up signal) from the sensor hub. When the second processor 432 is in the sleep state, the display 440 of the electronic device 400 may be entirely turned off or may be in an AOD mode of being partially turned on.

The display 440 may visually provide information to the outside of the electronic device 400 and may display various types of content. The display 440 may include a display panel, a hologram device, or a projector and a control circuit (e.g., a display driver IC (DDI)) to control a corresponding device. The display 440 may include touch circuitry configured to detect a touch or sensor circuitry (e.g., a pressure sensor) configured to measure the strength of force generated by a touch and may receive a touch, gesture, proximity, or hovering input using an electronic pen or a user's body part. At least a portion of the display 440 may be made of a flexible material, and the portion may be bent when a force is applied thereto.

The display 440 may provide a rectangular screen. However, the shape of the screen is not limited to a rectangle and may include other suitable shapes, such as a rectangle with a rounded corner, a circle, a rectangle having a notched portion, and a rectangle having a circular hole in a portion depending on the type or design of the electronic device 400.

The authentication module 450 may perform user authentication using unique information about a user (e.g., a face shape, an iris pattern, a face depth, or the shape of a blood vessel on a face). The authentication module 450 may detect the unique information about the user using the camera 451 under control of the first processor 431 and/or the second processor 432 and may perform user authentication by comparing the detected unique information about the user with unique information about a reference user stored in advance.

The camera 451 may include an image sensor, a red, green, blue (RGB) camera, an infrared camera, and/or a depth camera. (e.g., a time-of-flight (ToF) camera or a structured-light (SL) camera), and may photograph a user's face in order to obtain unique information about a user (e.g., a face shape, an iris pattern, a face depth, the shape of a blood vessel on a face, or liveness). A method for performing user authentication using the obtained unique information about the user may include user identification based on a face shape and/or a face depth, identification based on an iris pattern, user identification based on the shape of a blood vessel on a face, and/or user identification based on a pulse on a face and a movement of the face.

A memory of the electronic device 400 may store various types of data (e.g., sensing data) used by at least one component (e.g., the processor 430) of the electronic device 400. The data may include input data or output data about software and a command associated therewith. The memory may include a volatile memory and a nonvolatile memory.

A battery of the electronic device 400 may be configured to store power required for the electronic device 400. The battery may include a lithium-ion battery or a capacitor and may be rechargeable or interchangeable. The battery may be charged using power (e.g., a direct current (DC) signal (DC power)) provided from a charging circuit.

Figure 5:
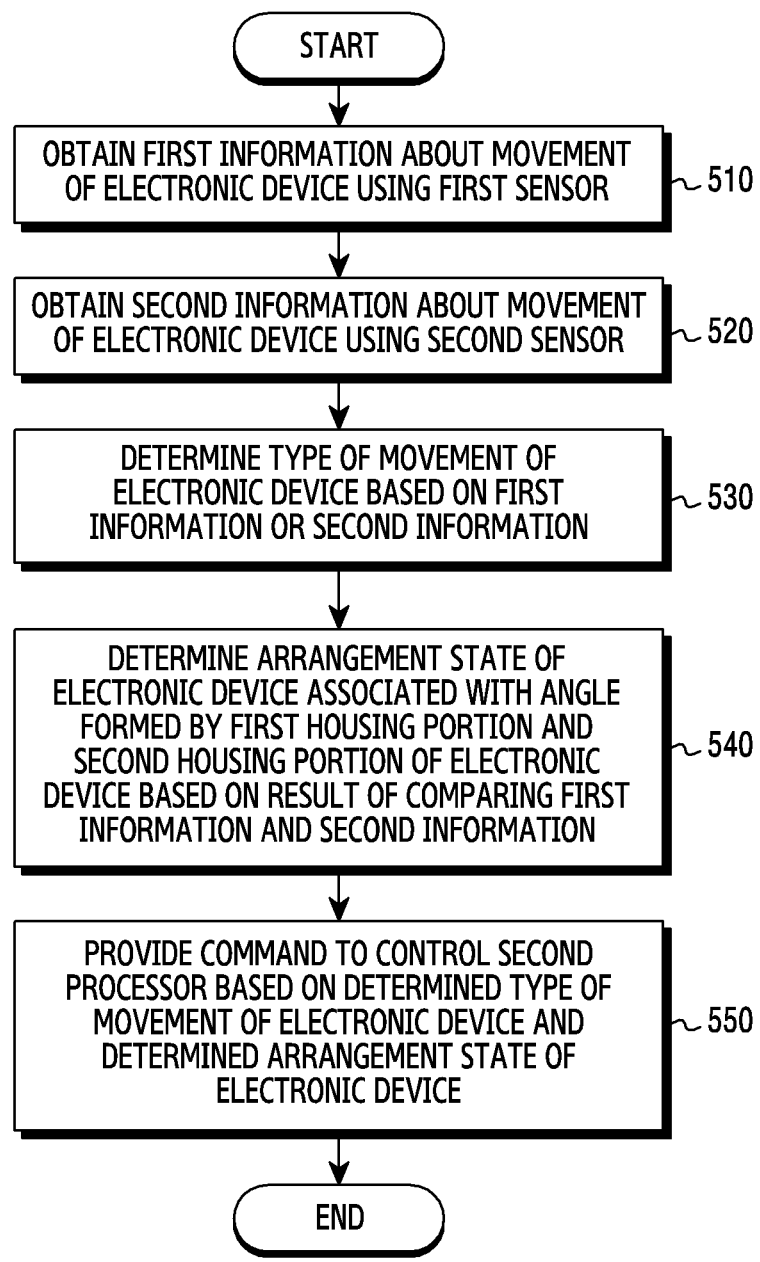
FIG. 5 is a flowchart illustrating a method for controlling an electronic device based on movement and an arrangement state of the electronic device according to an embodiment.

FIG. 5 is a flowchart illustrating a method for controlling an electronic device based on movement and an arrangement state of the electronic device according to an embodiment. For example, the method of FIG. 5 will be described below as being performed by the electronic device 400 of FIG. 4.

Referring to FIG. 5, in step 510, the first processor 431 obtains first information about movement of the electronic device 400 using the first sensor 421. In step 520, the first processor 431 obtains second information about a movement of the electronic device 400 using the second sensor 422.

The first sensor 421 and/or the second sensor 422 may be inertial sensors, and the first information and the second information may include first sensing data and second sensing data obtained by detecting movements of the first housing portion 411 and the second housing portion 412 corresponding to a plurality of axes, respectively. The inertial sensors may be configured to obtain sensing data every preset time (e.g., 20 ms).

The first sensing data may be obtained by detecting a movement of the first housing portion 411 and may include an acceleration signal for each of a plurality of axes (e.g., an x-axis, a y-axis, and a z-axis) detected by the first inertial sensor. The second sensing data may be obtained by detecting a movement of the second housing portion 412 and may include an acceleration signal for each of the plurality of axes (e.g., an x-axis, a y-axis, and a z-axis) detected by the second inertial sensor. The first processor 431 may determine the type of the movement (e.g., lifting-up) and the arrangement state (e.g., the unfolded state, the intermediate state, or the folded state) of the electronic device 400 based on at least part of the first sensing data and the second sensing data.

Obtaining the first information and the second information in steps 510 and 520 may be performed until the movement of the electronic device 400 is stopped (or always regardless of whether the electronic device moves).

In step 530, the first processor 431 determines a type of movement of the electronic device 400 based on the first information and/or the second information. For example, the first processor 431 may determine that the movement of the electronic device 400 is a motion of the user lifting up the electronic device 400 based on the first information or the second information.

In step 540, the first processor 431 determines an arrangement state of the electronic device 400 associated with an angle formed by the first housing portion 411 and the second housing portion 412 based on a result of comparing the first information and the second information.

The first processor 431 may determine the arrangement state of the electronic device 400 associated with the angle formed by the first housing portion 411 and the second housing portion 412 based on the result of comparing the first information and the second information. The first processor 431 may analyze similarity and symmetry between a first sensing data signal and a second sensing data signal obtained by the first inertial sensor and the second inertial sensor for each axis (e.g., the x-axis, the y-axis, and the z-axis), thereby obtaining the angle formed by the first housing portion 411 and the second housing portion 412. The arrangement state of the electronic device 400 may be determined as at least one of the unfolded state, the intermediate state, and the folded state according to the angle formed by the first housing portion 411 and the second housing portion 412. The intermediate state may be divided once more according to the angle formed by the first housing portion 411 and the second housing portion 412, e.g., into a first intermediate state and a second intermediate state, depending on whether the angle formed by the first housing portion 411 and the second housing portion 412 exceeds 90 degrees.

In step 550, the first processor 431 provides a command (or signal) to control the second processor 432 (e.g., the application processor) based on the determined type of the movement of the electronic device 400 and the determined arrangement state of the electronic device 400.

Figure 6:
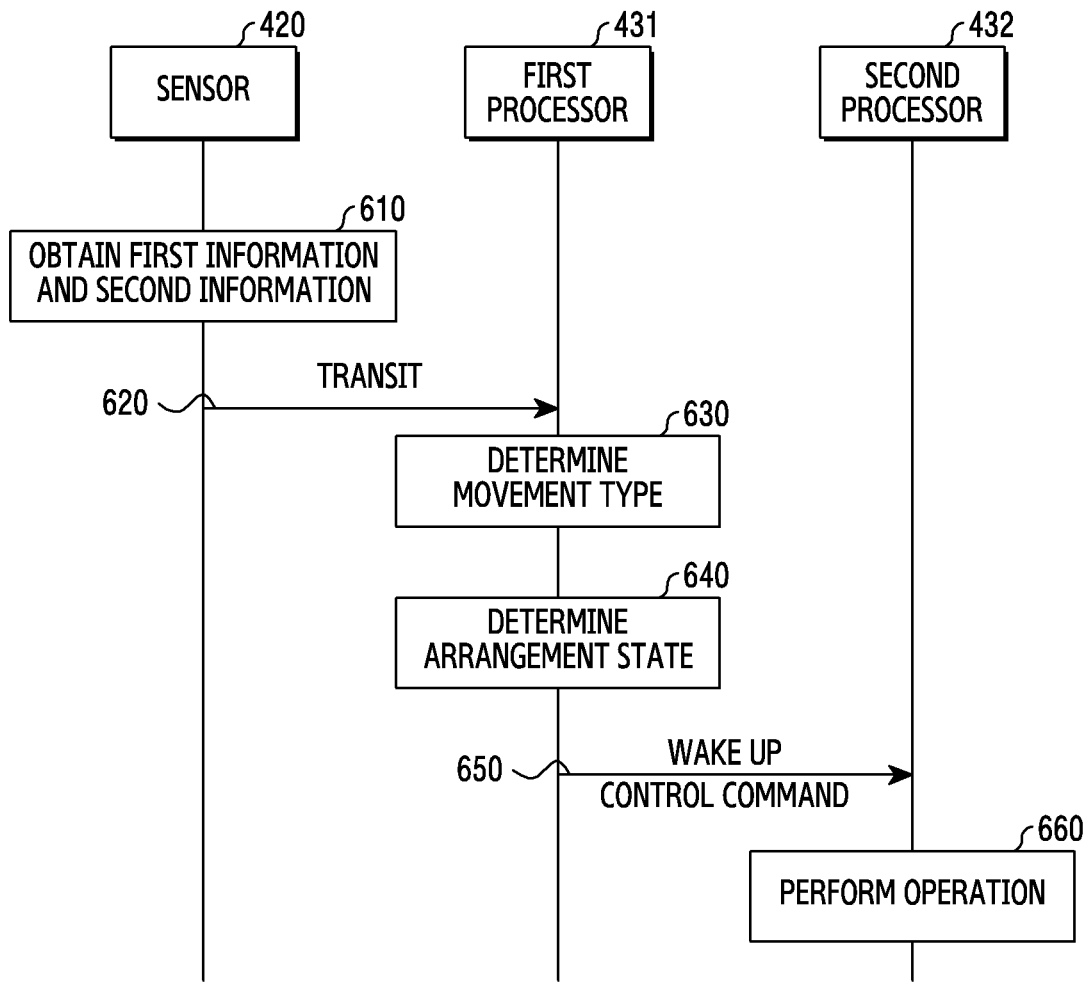
FIG. 6 is a signal flow diagram, illustrating a method for controlling an electronic device based on movement and an arrangement state of the electronic device according to an embodiment.

FIG. 6 is a signal flow diagram illustrating a method for controlling an electronic device based on movement and an arrangement state of the electronic device according to an embodiment. For example, the method of FIG. 6 will be described below as being performed by the electronic device 400 of FIG. 4.

Referring to FIG. 6, in step 610, the sensor 420 (e.g., the first sensor 421 and the second sensor 422) obtains first information and second information about movement of the housing 410 (e.g., the first housing portion 411 and the second housing portion 412). The sensor 420 may be an inertial sensor, the first information may include first sensing data corresponding to a plurality of axes detected by the first inertial sensor, and the second information may include second sensing data corresponding to a plurality of axes detected by the second inertial sensor.

In step 620, the first information and the second information obtained by the sensor 420 is transmitted to the first processor 431 electrically connected with the sensor 420. The first processor 431 determines a corresponding movement type (e.g., lifting-up) of the electronic device 400 among preset movement types based on the transmitted first information and/or second information in step 630, and determines an arrangement state (e.g., an unfolded state, an intermediate state, or a folded state) of the electronic device 400 associated with an angle formed by the first housing portion 411 and the second housing portion 412 of the electronic device 400 based on a comparison of the first information and the second information in step 640.

In step 650, the first processor 431 transmits a command to control the second processor 422, thereby activating the second processor 432.

In step 660, the second processor 432 performs a specified operation based on the control command received from the first processor 431. The specified operation may be performed through at least one application installed in the electronic device 400.

Figure 7:
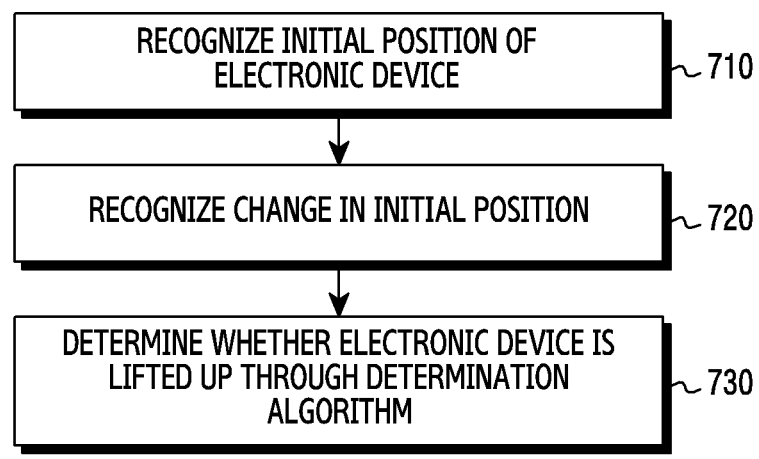
FIG. 7 is a flowchart illustrating a method for controlling an electronic device based on movement and an arrangement state of the electronic device according to an embodiment.

FIG. 7 is a flowchart illustrating a method for controlling an electronic device based on movement and an arrangement state of the electronic device according to an embodiment. For example, the method of FIG. 7 may be performed during step 530 of FIG. 5.

Referring to FIG. 7, in step 710, the first processor 431 recognizes an initial position of the electronic device 400. The first processor 431 may recognize that the electronic device 400 initially lies on a flat surface (e.g., a tabletop) in the unfolded state (e.g., with the rear surface facing the floor) and inclines at a certain angle.

In step 720, the first processor 431 recognizes that the initial position of the electronic device 400 has been changed, and in step 730, determines whether the electronic device 400 has been lifted up through the determination algorithm, when the change is recognized. The lifting-up may include movement of the electronic device 400 being lifted up in the vertical direction from the flat surface and/or movement of the electronic device 400 being lifted up in the vertical direction from the flat surface and inclining to the user. The first processor 431 may additionally use a low-pass filter (LPF) as a method for removing noise in order to increase the speed of determining the movement type.

The first processor 431 of the electronic device 400 may always be in an active state to collect the first information and the second information from the sensor 420. In addition, the first processor 431 may be initially in the sleep state, and may wake up, may collect the first information and the second information from the sensor 420, and may determine the type of the movement (e.g., lifting-up) of the electronic device 400 upon recognizing a change in the initial position.

Figure 8:
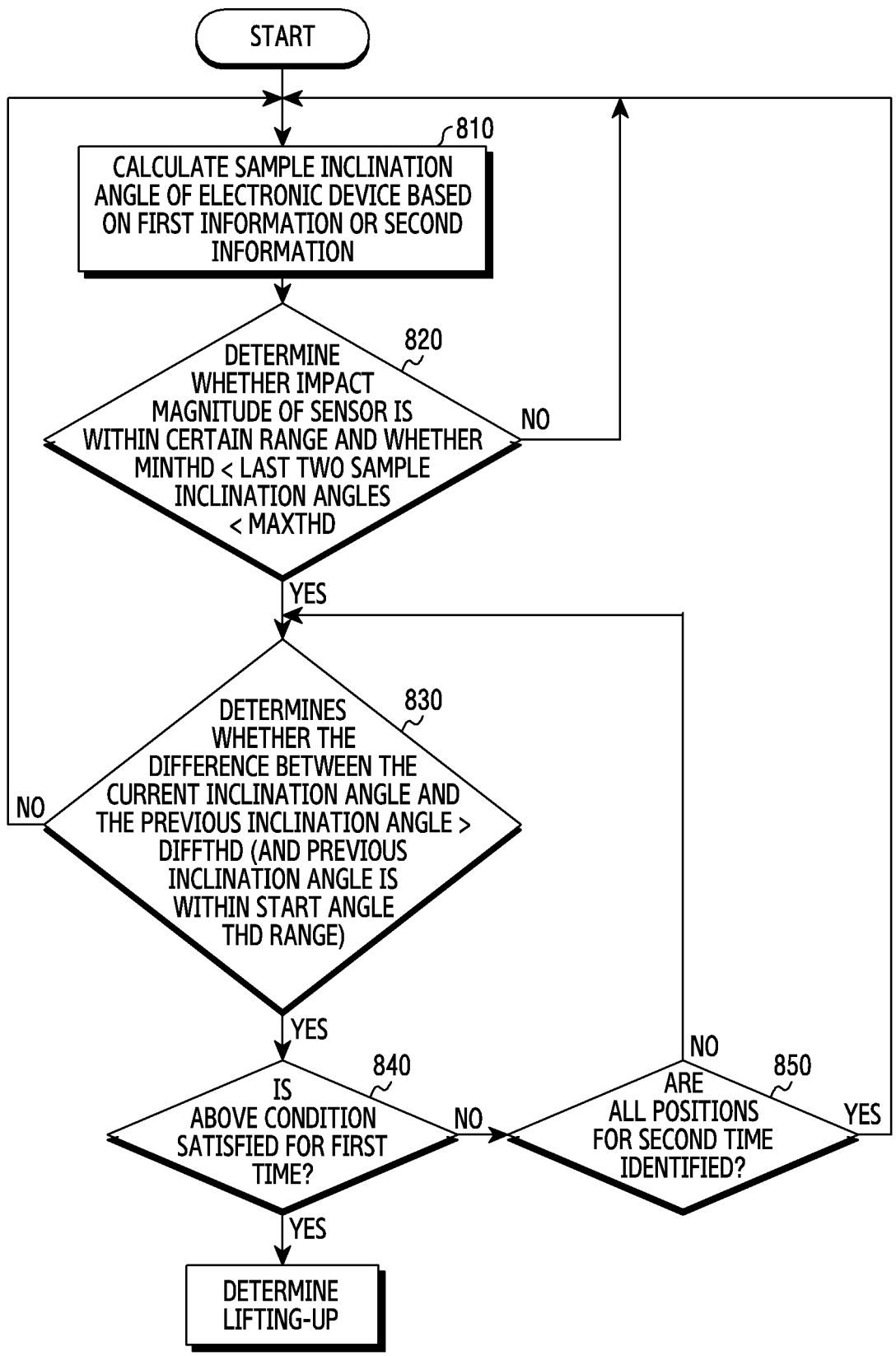
FIG. 8 is a flowchart illustrating a method for determining a type of movement of an electronic device according to an embodiment.
Figure 9:
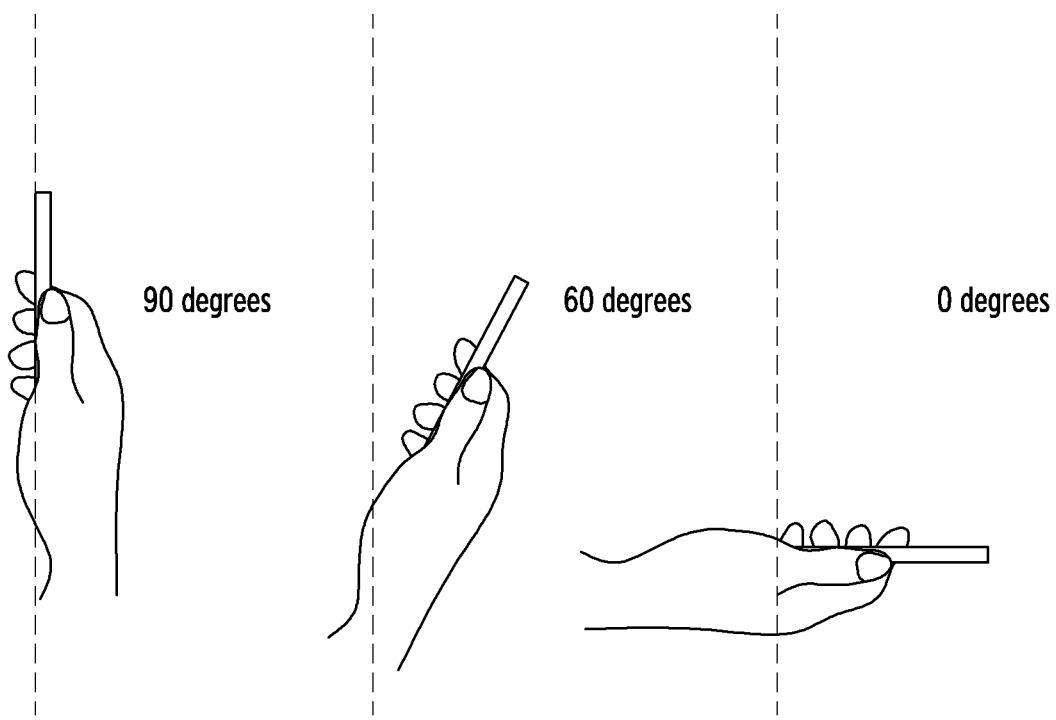
FIG. 9 illustrates inclination angles of an electronic device according to an embodiment.

FIG. 8 is a flow chart illustrating a method for determining a type of movement of an electronic device according to an embodiment. FIG. 9 illustrates an inclination angle of an electronic device with respect to a flat surface according to an embodiment. In FIGS. 8 and 9, the inclination angle of the electronic device 400 may be an angle at which the first housing portion 411 or the second housing portion 412 is inclined relative to the flat surface rather than an angle formed between the first housing portion 411 and the second housing portion 412.

Referring to FIG. 8, the first processor 431 calculates an inclination angle of the electronic device 400 based on the first information and/or the second information obtained from the sensor 420 in step 810. The inclination angle of the electronic device 400 is an angle at which the electronic device 400 is inclined relative to the flat surface. The first processor 431 may calculate and store the sample inclination angle of the electronic device 400 at a certain interval (e.g., 20 ms) based on the first information and the second information obtained at the certain interval (e.g., 20 ms).

Referring to FIG. 9, the electronic device 400 illustrated at inclination angles of 90 degrees, 60 degrees, and 0 degrees.

Referring back to FIG. 8, in step 820, the first processor 431 determines whether the impact magnitude of at least one sensor is within a certain range (e.g., from 0.8 times gravitational acceleration to 1.2 times gravitational acceleration) based on the first information and the second information and determine whether the last two samples of the angle calculated in step 810 are greater than a certain threshold value (minTHD) and are less than a certain threshold value (maxTHD). The last two samples may be obtained at an interval of 20 ms, the value of minTHD may be 20 degrees, and the value of maxTHD may be 110 degrees. The first processor 431 may determine whether lifting-up occurs at a normal speed in step 820 and may filter out a sudden lifting-up or rotational motion. The interval (20 ms) for the samples, the value of minTHD (20 degrees), and the value of maxTHD (110 degrees) are provided for illustration purposes, and other intervals may be applied.

When both conditions are satisfied in step 820, the first processor 431 determines whether the difference between the current inclination angle and the previous inclination angle is greater than a certain threshold value (diffTHD) and determines whether the previous inclination angle is within a certain threshold (start angle THD range) in step 830. The previous inclination angle may be an initial inclination angle, and the current inclination angle may be an inclination angle after a certain time. The first processor 431 determines whether the electronic device 400, which stands vertically, is lifted up when the angle with respect to the flat surface gradually increases or is vertically lifted up when in the angle does not change in step 830. The value of diffTHD may be 30 degrees, and the start angle THD range may exclude 30 degrees to 150 degrees, i.e., between 0 degrees and 30 degrees and between 150 degrees and 180 degrees. The example value of diffTHD and the start angle THD range are provided for illustration purposes, and other values may be applied.

When the conditions are satisfied in step 830, the first processor 431 determines whether the conditions in steps 820 and 830 are satisfied within a first time interval (e.g., 320 ms) in step 840. When samples are extracted at an interval of 20 ms, the first processor 431 may analyze about 16 samples over 320 ms.

When the condition is satisfied in step 840, the first processor 431 determines that the type of the movement of the electronic device 400 is a lifting-up. However, when the condition is not satisfied in step 840, the first processor 431 determines whether all positions are identified within a second time interval (e.g., 1.1 seconds) in step 850.

The second time interval corresponds to a total buffer size for analyzing data and may be longer than the first time interval. The first processor 431 may identify the entire buffer by continuous backtracking in 16 samples. The first time interval is a specified certain time period (window sampling period), and the second time interval is a total time period (time-out period). The examples of the first time interval (320 ms), the second time interval (1.1 seconds), and the backtracking sample unit (16 samples) are provided for illustration purposes, and other values may be applied.

Based on the determination in step 850, the method returns to step 810 or step 830.

Using the method of FIG. 8, the first processor 431 may filter out a very fast movement or a very slow movement, and may determine whether the electronic device 400 is stopped within a certain time after starting to be moved and is lifted up in a state of standing vertically, being rotated only in a certain direction, thereby determining whether normal lifting-up is performed. The normal lifting-up may include a user lifting up the electronic device 400 at a normal speed and/or a lifting up the electronic device 400 and inclining the electronic device 400 to the user at a normal slope.

Figure 10A:
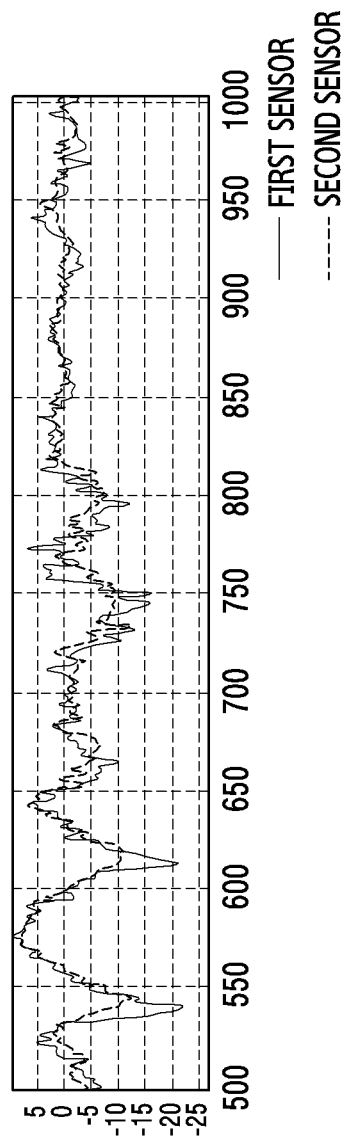
FIG. 10A is a graph illustrating a sensing data signal on an x-axis detected by a sensor when an electronic device is in an unfolded state according to an embodiment.
Figure 10B:
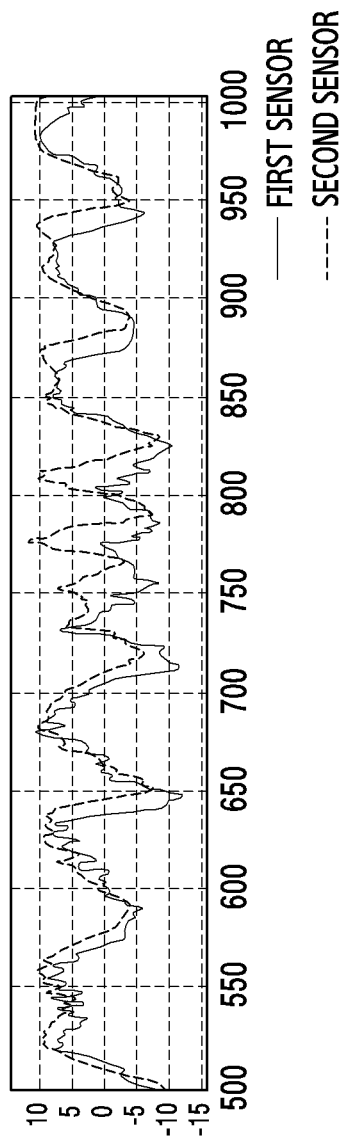
FIG. 10B is a graph illustrating a sensing data signal on a y-axis detected by a sensor when an electronic device is in an unfolded state according to an embodiment.
Figure 10C:
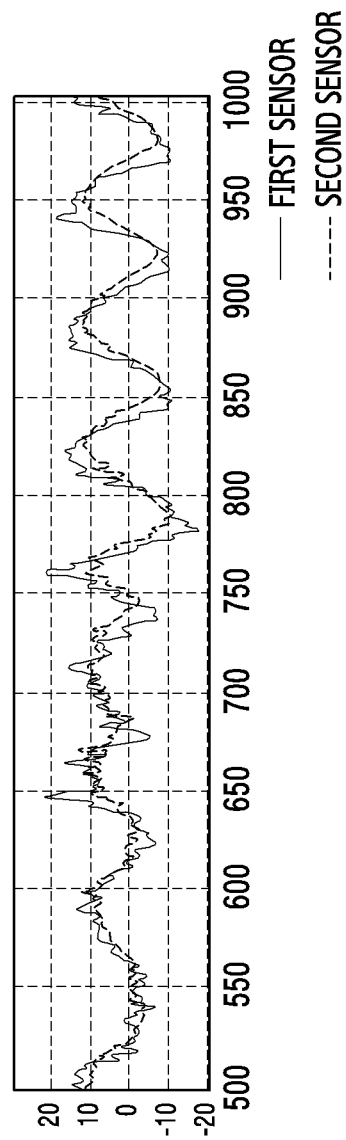
FIG. 10C is a graph illustrating a sensing data signal on a z-axis detected by a sensor when an electronic device is in an unfolded state according to an embodiment.

FIG. 10A is a graph illustrating a sensing data signal on an x-axis detected by a sensor when an electronic device is in an unfolded state according to an embodiment, FIG. 10B is a graph illustrating a sensing data signal on a y-axis detected by the sensor when the electronic device is in the unfolded state according to an embodiment, and FIG. 10C is a graph illustrating a sensing data signal on a z-axis detected by the sensor when the electronic device is in the unfolded state according to an embodiment.

Referring to FIGS. 10A to 10C, when the electronic device 400 is in the unfolded state, first sensing data signals and second sensing data signals on the x-axis, y-axis, and z-axis are shown in similar patterns. Accordingly, when both first sensing data and second sensing data on the plurality of axes have a similarity of a threshold value or greater, the first processor 431 may determine the arrangement state of the electronic device 400 as being the unfolded state, wherein the first housing portion 411 and the second housing portion 412 form a first angle (e.g., 170 degrees or 175 degrees) or greater.

Figure 11A:
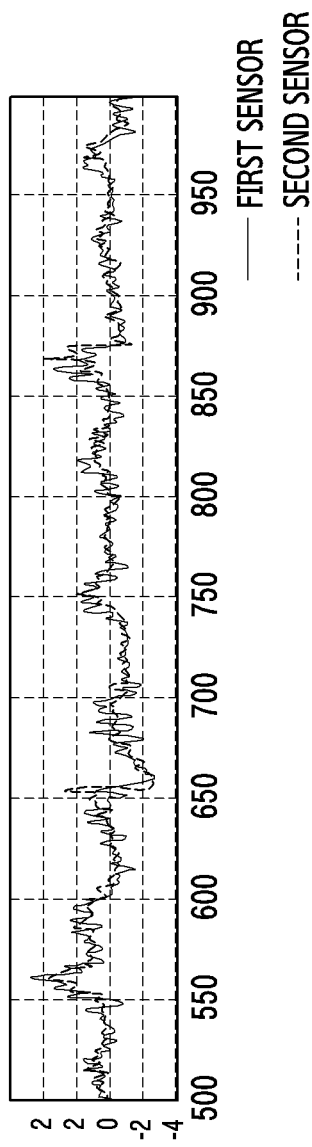
FIG. 11A is a graph illustrating a sensing data signal on an x-axis detected by a sensor when an angle between a first housing portion and a second housing portion is about 140 degrees in an intermediate state of an electronic device according to an embodiment.
Figure 11B:
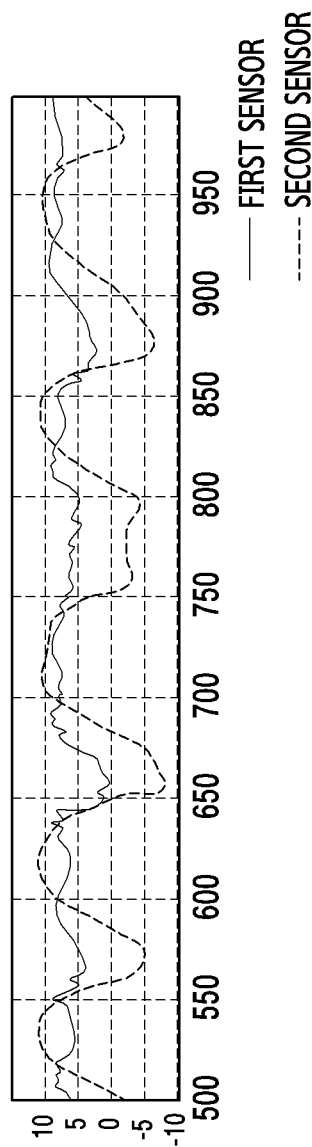
FIG. 11B is a graph illustrating a sensing data signal on a y-axis detected by a sensor when an angle between a first housing portion and a second housing portion is about 140 degrees in an intermediate state of an electronic device according to an embodiment.
Figure 11C:
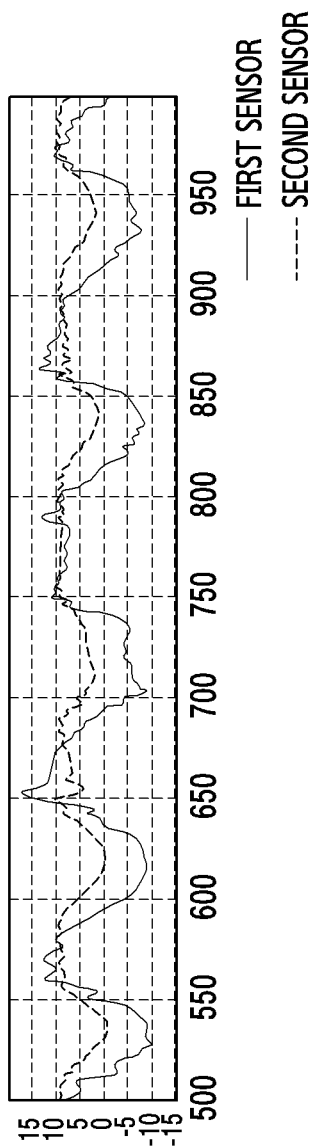
FIG. 11C is a graph illustrating a sensing data signal on a z-axis detected by a sensor when an angle between a first housing portion and a second housing portion is about 140 degrees in an intermediate state of an electronic device according to an embodiment.

FIG. 11A is a graph illustrating a sensing data signal on an x-axis detected by a sensor when an angle between a first housing portion and a second housing portion of an electronic device is about 140 degrees in an intermediate state according to an embodiment, FIG. 11B is a graph illustrating a sensing data signal on a y-axis detected by the sensor when the angle between the first housing portion and the second housing portion of the electronic device is about 140 degrees in the intermediate state according to an embodiment, and FIG. 11C is a graph illustrating a sensing data signal on a z-axis detected by the sensor when the angle between the first housing portion and the second housing portion of the electronic device is about 140 degrees in the intermediate state according to an embodiment.

Figure 12A:
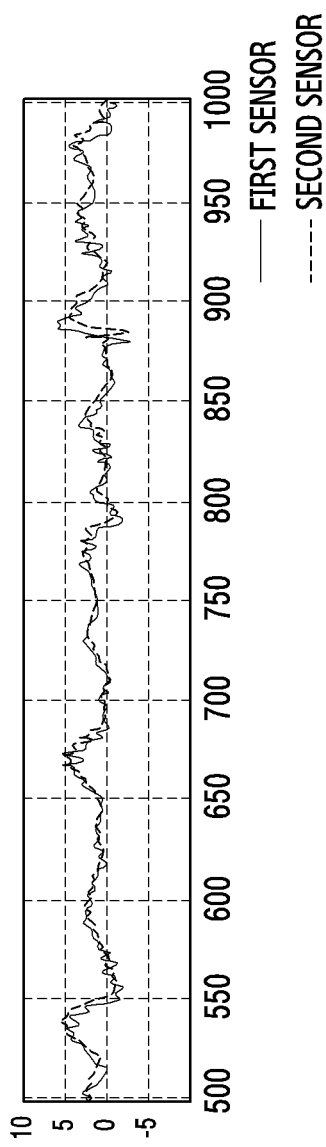
FIG. 12A is a graph illustrating a sensing data signal on an x-axis detected by a sensor when an angle between a first housing portion and a second housing portion is about 70 degrees in an intermediate state of an electronic device according to an embodiment.
Figure 12B:
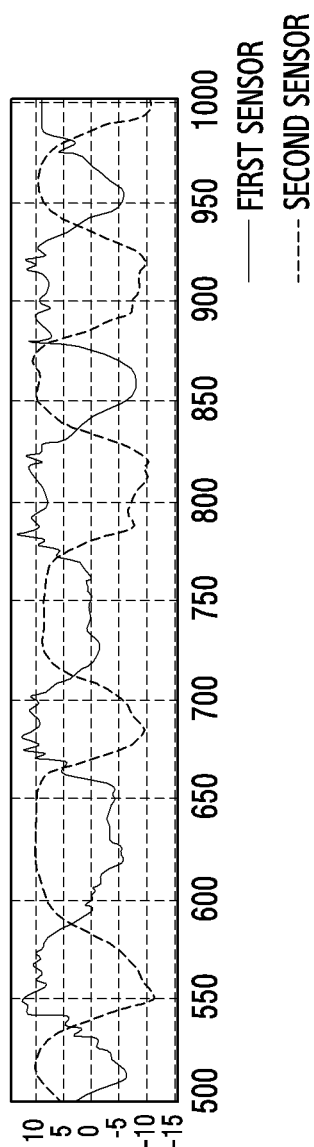
FIG. 12B is a graph illustrating a sensing data signal on a y-axis detected by a sensor when an angle between a first housing portion and a second housing portion is about 70 degrees in an intermediate state of an electronic device according to an embodiment.
Figure 12C:
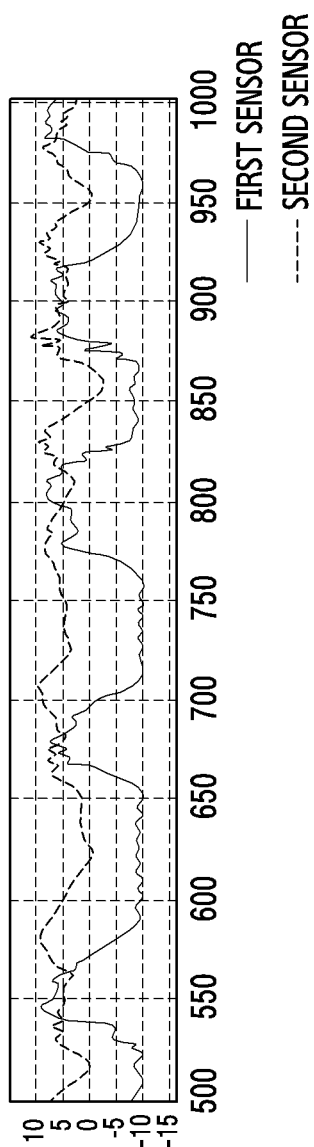
FIG. 12C is a graph illustrating a sensing data signal on a z-axis detected by a sensor when an angle between a first housing portion and a second housing portion is about 70 degrees in an intermediate state of an electronic device according to an embodiment.

FIG. 12A is a graph illustrating a sensing data signal on an x-axis detected by a sensor when an angle between a first housing portion and a second housing portion of an electronic device is about 70 degrees in an intermediate state according to an embodiment, FIG. 12B is a graph illustrating a sensing data signal on a y-axis detected by the sensor when an angle between the first housing portion and the second housing portion of the electronic device is about 70 degrees in the intermediate state according to an embodiment, and FIG. 12C is a graph illustrating a sensing data signal on a z-axis detected by the sensor when the angle between the first housing portion and the second housing portion of the electronic device is about 70 degrees in the intermediate state according to an embodiment.

Referring to FIGS. 11A to 11C and FIGS. 12A to 12C, when the electronic device 400 is in the intermediate state, a first sensing data signal and a second sensing data signal on the x-axis are shown in similar patterns, whereas first sensing data signals and second sensing data signals on the y-axis and the z-axis show neither similarity nor symmetry. Accordingly, when first sensing data and second sensing data on at least one of the plurality of axes have a similarity less than the threshold value and have a symmetry less than a threshold value, the first processor 431 may determine the arrangement state of the electronic device 400 as being the intermediate state in which the first housing portion 411 and the second housing portion 412 form an angle that is greater than or equal to a second angle (e.g., 5 degrees or 10 degrees) and is less than the first angle (e.g., 170 degrees or 175 degrees).

FIG. 13A is a graph illustrating a sensing data signal on an x-axis detected by a sensor when an electronic device is in a folded state according to an embodiment, FIG. 13B is a graph illustrating a sensing data signal on a y-axis detected by the sensor when the electronic device is in the folded state according to an embodiment, and FIG. 13C is a graph illustrating a sensing data signal on a z-axis detected by the sensor when the electronic device is in the folded state according to an embodiment.

Referring to FIGS. 13A to 13C, when the electronic device 400 is in the folded state, a first sensing data signal and a second sensing data signal on the x-axis are shown in similar patterns, whereas first sensing data signals and second sensing data signals on the y-axis and the z-axis show symmetry. Accordingly, when first sensing data and second sensing data on a first axis of the plurality of axes have a similarity of the threshold value greater and first sensing data and second sensing data on a second axis have a symmetry of the threshold value greater, the first processor 431 may determine the arrangement state of the electronic device 400 as being the folded state in which the electronic device 400 is folded such that the first housing portion 411 and the second housing portion 412 form an angle less than the second angle (e.g., 5 degrees or 10 degrees) or 0 degrees.

Figure 14:
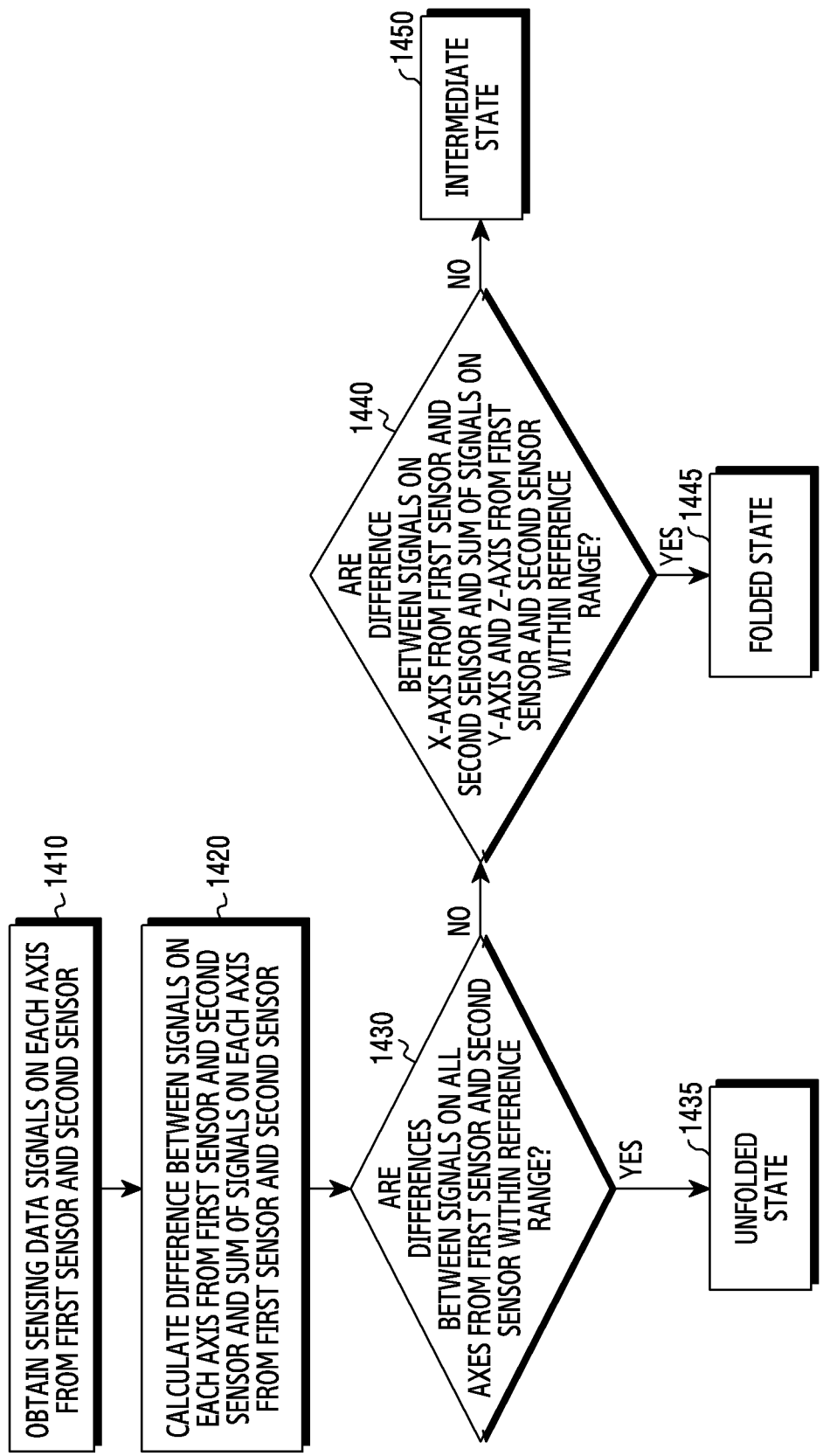
FIG. 14 is a flowchart illustrating a method for controlling an electronic device based on movement and an arrangement state of an electronic device according to an embodiment.

FIG. 14 is a flow chart illustrating a method for controlling an electronic device based on movement and an arrangement state of the electronic device according to an embodiment. For example, the method of FIG. 14 may be performed during step 540 of FIG. 5.

Referring to FIG. 14, the first processor 431 obtains sensing data signals on each axis from the first sensor 421 and the second sensor 422 in step 1410, and calculates a difference between the signals on each axis from the first sensor 421 and the second sensor 422 and the sum of the signals on each axis from the first sensor 421 and the second sensor 422 in step 1420.

In step 1430, the first processor 431 determines whether the differences between the signals on all axes from the first sensor 421 and the second sensor 422 are within a certain reference range (e.g., from −2.5 or more to less than +2.5) (1430).

When the differences between the signals on all axes from the first sensor 421 and the second sensor 422 are within the certain reference range in step 1430, the first processor 431 determines the arrangement state of the electronic device 400 as being the unfolded state in step 1435.

However, when the differences between the signals on all axes from the first sensor 421 and the second sensor 422 are not within the certain reference range in step 1430, the first processor 431 determines whether the difference between the signals on the x-axis from the first sensor 421 and the second sensor 422 and the sum of the signals on the y-axis and z-axis from the first sensor 421 and the second sensor 422 are within the certain reference range (e.g., from −2.5 or more to less than +2.5) in step 1440.

When the conditions in step 1440 are satisfied, the first processor 431 determine the arrangement state of the electronic device 400 as being the folded state in step 1445, but when the condition in step 1440 is not satisfied in step 1440, the first processor 431 determines the arrangement state of the electronic device 400 as being the intermediate state in step 1450.

Even though the first processor 431 recognizes a lifting-up movement of the electronic device 400, a different function may be supported or performed depending on the arrangement state of the electronic device 400. For example, when the first processor 431 determines the lifting-up movement of the electronic device 400 and determines the arrangement state of the electronic device 400 as being the unfolded state, the first processor 431 may transmit a command associated with user authentication to the second processor 432. The user authentication may be performed by an iris recognition or face recognition method, and the first processor 431 may transmit a control command to the second processor 432 so that the second processor 432 performs a preset user authentication method.

When the first processor 431 determines the lifting-up movement of the electronic device 400 and determines the arrangement state of the electronic device 400 as being the intermediate state, the first processor 431 may transmit a command associated with control of the display 440 to the second processor 432. The command associated with the control of the display 440 may be an AOD mode execution command, and the first processor 431 may transmit the command to the second processor 432 so that the second processor 432 may execute the AOD mode of the display 440. When the electronic device 400 is in the intermediate state, the AOD mode may have been executed since the initial state, i.e., before the electronic device 400 is lifted up, and the first processor 431 may support the AOD mode to be maintained even after determining the lifting-up movement. For example, the first processor 431 may not transmit the control command to the second processor 432. In the AOD mode, the display 440 is continuously driven in a low-power state and information, such as the current time, may be continuously provided to the user through the display 440.

When the first processor 431 determines the lifting-up movement of the electronic device 400 and determines the arrangement state of the electronic device 400 as being the intermediate state, the first processor 431 may transmit a different control command to the second processor 432 according to the angle between the first housing portion 411 and the second housing portion 412. For example, when the first processor 431 determines the lifting-up movement of the electronic device 400 and determines that the angle between the first housing portion 411 and the second housing portion 412 is less than 90 degrees in the intermediate state, the first processor 431 may provide an AOL) mode execution command to the second processor 432. As another example, when the first processor 431 determines the lifting-up movement of the electronic device 400 and determines that the angle between the first housing portion 411 and the second housing portion 412 is greater than 90 degrees in the intermediate state, the first processor 431 may provide a control command associated with user authentication (e.g., iris recognition, face shape recognition, or facial vein recognition) to the second processor 432.

When the first processor 431 determines the lifting-up movement of the electronic device 400 and determines the arrangement state of the electronic device 400 as being the folded state, the first processor 431 may transmit a command associated with control of an auxiliary display to the second processor 432. The command associated with the control of the auxiliary display may turn on the auxiliary display, and the first processor 431 may transmit the command to the second processor 432 so that the second processor 432 may turn on the auxiliary display.

A device for user authentication, such as a camera and a fingerprint recognition sensor, may also be disposed on the rear surface of the electronic device 400. In this case, even though the electronic device is in the folded state, the first processor 431 may provide a control command associated with user authentication (e.g., iris recognition, face recognition, or fingerprint recognition) to the second processor 432 when determining the lifting-up movement.

The foregoing commands to control the second processor 432 are provided for illustration purposes, and the first processor 431 may provide various other commands to control the functions of the electronic device 400 to the second processor 432.

The second processor 432 may perform a specified operation based on the control command received from the first processor 431. The second processor 432 may be, as a separate module from the first processor 431, an AP to generally manage and control a function of an application or a program installed in the electronic device 400.

Figure 15:
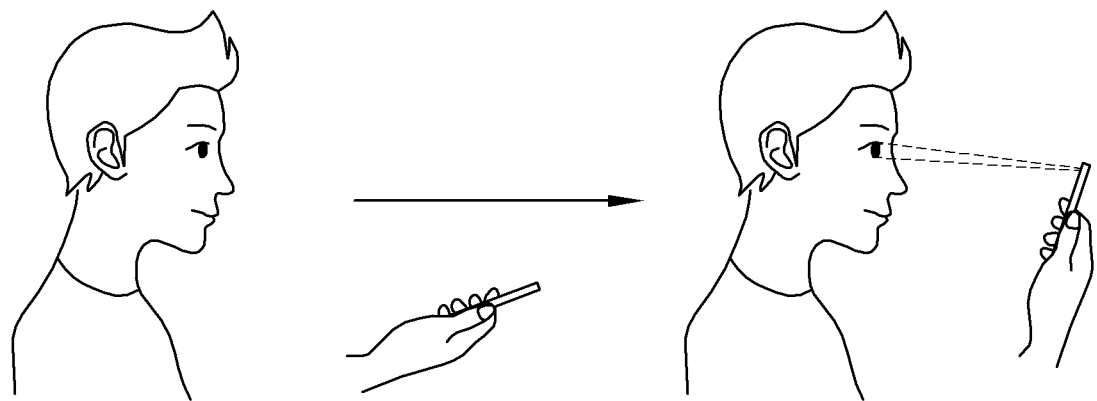
FIG. 15 illustrates a second processor of an electronic device performing user authentication through iris recognition according to an embodiment.

FIG. 15 illustrates a second processor of an electronic device performing user authentication through iris recognition according to an embodiment.

Referring to FIG. 15, when the second processor 432 receives a user authentication command through iris recognition from the first processor 431, the second processor 432 may control the authentication module 450 and may display a screen for performing iris authentication on the display 440 (or auxiliary display). The authentication module 450 may control the camera 451 to photograph the user's iris and may compare iris image data obtained by the camera 451 with stored reference iris image data, thereby performing iris authentication.

As another example, when the second processor 432 receives a user authentication command through face recognition from the first processor 431, the second processor 432 may control a face authentication module and may display a screen for performing face authentication on the display 440 (or auxiliary display).

When the second processor 432 receives an AOD mode execution command from the first processor 431, the second processor 432 may maintain the AOD mode of the display 440. When the second processor 432 receives an auxiliary display control command from the first processor 431, the second processor 432 may turn on the auxiliary display.

The foregoing operations performed by the second processor 432 are provided for illustration purposes, and the second processor 432 may perform various other operations based on a control command provided from the first processor 431.

The second processor 432 of the electronic device 400 may initially be in the sleep state, and may wake up and may perform a specified operation based on a control command upon receiving the control command from the first processor 431. The sleep state is a low-power mode, and may be an idle state in which the processor minimally functions in order to minimize power consumption.

According to an embodiment, a method for controlling an electronic device according to a movement of the electronic device includes obtaining first information about a movement of the electronic device using a first sensor disposed in a first housing portion of the electronic device; obtaining second information about the movement of the electronic device using a second sensor disposed in a second housing portion of the electronic device; determining a type of the movement of the electronic device based on the first information or the second information; determining an arrangement state of the electronic device associated with an angle formed by the first housing portion and the second housing portion of the electronic device based on a result of comparing the first information and the second information; and providing a command (or signal) to control an AP in the application processor based on the determined type of the movement of the electronic device and the determined arrangement state of the electronic device.

When first sensing data and second sensing data detected respectively by the first sensor and the second sensor for detecting a movement corresponding to a plurality of axes have a similarity of a threshold value or greater on the plurality of axes, determining the arrangement state of the electronic device may include determining that the arrangement state of the electronic device is an unfolded state in which the electronic device is unfolded such that the first housing portion and the second housing portion form a first angle or greater.

When first sensing data and second sensing data about a first axis of first sensing data and second sensing data detected respectively by the first sensor and the second sensor for detecting a movement corresponding to a plurality of axes have a similarity of a threshold value or greater and first sensing data and second sensing data about a second axis have a symmetry of a threshold value or greater, determining the arrangement state of the electronic device may include determining that the arrangement state of the electronic device is a folded state in which the electronic device is folded such that the first housing portion and the second housing portion form an angle of less than a second angle.

When first sensing data and second sensing data about at least one axis of first sensing data and second sensing data detected respectively by the first sensor and the second sensor for detecting a movement corresponding to a plurality of axes have a similarity less than a threshold value and a symmetry less than a threshold value, determining the arrangement state of the electronic device may include determining that the arrangement state of the electronic device is an intermediate state in which the electronic device is folded such that the first housing portion and the second housing portion form an angle that is equal to or greater than a second angle and is less than a first angle.

When the type of the movement of the electronic device is determined as vertically lifting up the electronic device with respect to a reference surface and the arrangement state is determined as the unfolded state, providing the control command may include transmitting a control command associated with user authentication to the application processor.

The application processor may activate an authentication module based on the received control command and may perform user authentication based on user iris information obtained through the authentication module.

When the type of the movement of the electronic device is determined as vertically lifting up the electronic device with respect to a reference surface and the arrangement state is determined as being the folded state, providing the command to the application processor may include transmitting a command associated with control of an auxiliary display to the application processor.

According to an embodiment, an electronic device may include a housing including a first housing portion and a second housing portion 42 rotatably connected to the first housing portion; a first sensor disposed in the first housing portion; a second sensor disposed in the second housing portion; an IR camera for iris authentication disposed in the first housing portion or the second housing portion; a first processor electrically connected to the first sensor and the second sensor; and a second processor electrically connected to the first processor and the camera, wherein the first processor may be configured to: obtain first information about a movement of the electronic device using the first sensor; obtain second information about the movement of the electronic device using the second sensor; determine a type of the movement of the electronic device based on the first information or the second information; determine an arrangement state of the electronic device associated with an angle formed by the first housing portion and the second housing portion of the electronic device based on a result of comparing the first information and the second information; and provide a command to control the second processor to the second processor based on the determined type of the movement of the electronic device and the arrangement state of the electronic device, and the second processor may be configured to perform a specified operation based on the command.

The electronic device may further include a main display disposed on one surface of the housing across the first housing portion and the second housing portion and an auxiliary display disposed on another surface of the housing.

The first processor may be a sensor hub, and the second processor may be an AP.

The type of the movement of the electronic device may include a lifting-up movement, and the arrangement state of the electronic device may include at least one of an unfolded state, a folded state, and an intermediate state.

The specified operation may include activating the camera and performing user iris authentication.

Various embodiments as described above herein are advantageous in that, since sensing data acquired from a sensor of an electronic device can be used both to determine the type of movement of the electronic device and to determine the arrangement state of the electronic device, the movement (e.g., lift up) of the electronic device can be recognized accurately and fast, an operation appropriate for the arrangement state of the electronic device can be performed, and availability optimized for a foldable electronic device can be provided.

Further, if a change in the initial position of the electronic device is recognized, sensing data for determining the arrangement state of the electronic device is collected, thereby improving current consumption necessary for sensing. In addition, a command for controlling an AP is provided based on the movement type and arrangement state determined by a sensor hub, and the AP is turned on accordingly, thereby minimizing battery usage by the electronic device.

Various other advantageous effects inferable directly or indirectly through this document may be provided.

While the disclosure has been shown and described above with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a housing including a first housing and a second housing rotatably connected to the first housing;
   a first sensor disposed in the first housing;
   a second sensor disposed in the second housing;
   a display disposed across the first housing and the second housing;
   a first processor; and
   a second processor,
   wherein the first processor is configured to:
      obtain, via the first sensor, first information about movement of the electronic device,
      obtain, via the second sensor, second information about the movement of the electronic device,
      determine a type of the movement of the electronic device based on at least one of the first information or the second information,
      determine an arrangement state of the electronic device associated with an angle formed by the first housing and the second housing of the electronic device, based on a comparison of the first information and the second information, and
      provide a command to control the second processor based on the determined type of the movement of the electronic device and the determined arrangement state of the electronic device, and
   wherein the second processor is configured to perform a specified operation based on the command,
   wherein the first sensor comprises a first inertial sensor configured to detect movement corresponding to a plurality of axes,
   wherein the second sensor comprises a second inertial sensor configured to detect movement corresponding to at least the plurality of axes,
   wherein the first information comprises first sensing data corresponding to the plurality of axes detected by the first inertial sensor,
   wherein the second information comprises second sensing data corresponding to the plurality of axes detected by the second inertial sensor, and
   wherein, when first sensing data and first second sensing data about a first axis of the plurality of axes have a similarity of a first threshold value or greater and second first sensing data and second sensing data about a second axis have a symmetry of a second threshold value or greater, the first processor determines that the arrangement state of the electronic device is a folded state in which the first housing and the second housing form a first angle less than a predetermined angle.

2. The electronic device claim 1, wherein, when the first sensing data and the second sensing data have a similarity of a third threshold value or greater, the first processor determines that the arrangement state of the electronic device is an unfolded state in which the first housing and the second housing form a second angle equal to or greater than the predetermined angle.

3. The electronic device of claim 2, wherein, when the type of the movement of the electronic device is determined as vertically lifting up the electronic device with respect to a reference surface and the arrangement state is determined as the unfolded state, the first processor transmits a control command associated with user authentication to the second processor.

4. The electronic device of claim 3, further comprising an authentication module,
   wherein the second processor activates the authentication module based on the received control command and performs user authentication based on user information obtained through the authentication module.

5. The electronic device of claim 1, further comprising an auxiliary display disposed in the first housing, the second housing, or across the first housing and the second housing,
   wherein, when the type of the movement of the electronic device is determined as vertically lifting up the electronic device with respect to a reference surface and the arrangement state is determined as the folded state, the first processor transmits a command associated with control of the auxiliary display to the second processor.

6. The electronic device of claim 1, wherein, when the first sensing data and the second sensing data about at least one axis of the plurality of axes have a similarity less than the first threshold value and a symmetry less than the second threshold value, the first processor determines that the arrangement state of the electronic device is an intermediate state in which the first housing and the second housing form a third angle that is greater than or equal to the first angle and is less than the second angle.

7. A method for controlling an electronic device including a first housing and a second housing, the method comprising:
   obtaining first information about movement of the electronic device using a first sensor disposed in the first housing;
   obtaining second information about the movement of the electronic device using a second sensor disposed in the second housing;
   determining a type of the movement of the electronic device based on at least one of the first information or the second information;
   determining an arrangement state of the electronic device associated with an angle formed by the first housing and the second housing of the electronic device based on a comparison of the first information and the second information; and providing a command to control an application processor (AP) based on the determined type of the movement of the electronic device and the determined arrangement state of the electronic device, wherein the first information comprises first sensing data corresponding to a plurality of axes detected by the first sensor, wherein the second information comprises second sensing data corresponding to the plurality of axes detected by the second sensor, and wherein, when first sensing data and first second sensing data about a first axis have a similarity of a first threshold value or greater and second first sensing data and second sensing data about a second axis have a symmetry of a second threshold value or greater, determining the arrangement state of the electronic device comprises determining that the arrangement state of the electronic device is a folded state in which the first housing and the second housing form a first angle that less than a predetermined angle.

8. The method of claim 7, wherein when the first sensing data and the second sensing data have a similarity of a third threshold value or greater on the plurality of axes, determining the arrangement state of the electronic device comprises determining that the arrangement state of the electronic device is an unfolded state in which the first housing and the second housing form a second angle equal to or greater than the predetermined angle.

9. The method of claim 8, wherein, when the type of the movement of the electronic device is determined as vertically lifting up the electronic device with respect to a reference surface and the arrangement state is determined as the unfolded state, providing the command to the AP comprises transmitting a control command associated with user authentication to the AP.

10. The method of claim 9, wherein the AP activates an authentication module based on the received control command and performs user authentication based on user information obtained through the authentication module.

11. The method of claim 7, wherein, when the type of the movement of the electronic device is determined as vertically lifting up the electronic device with respect to a reference surface and the arrangement state is determined as the folded state, providing the command to the AP comprises transmitting a command associated with control of an auxiliary display to the AP.

12. The method of claim 7, wherein when the first sensing data and the second sensing data about at least one axis have a similarity less than the first threshold value and a symmetry less than the second threshold value, determining the arrangement state of the electronic device comprises determining that the arrangement state of the electronic device is an intermediate state in which the first housing and the second housing form a third angle that is greater than or equal to the first angle and is less than the second angle.

13. An electronic device, comprising:

a housing including a first housing and a second housing rotatably connected to the first housing;

a first sensor disposed in the first housing;

a second sensor disposed in the second housing;

a camera for user authentication;

a first processor; and a second processor, wherein the first processor is configured to:
  obtain, via the first sensor, first information about movement of the electronic device,
  obtain, via the second sensor, second information about the movement of the electronic device,
  determine a type of the movement of the electronic device based on at least one of the first information or the second information,
  determine an arrangement state of the electronic device associated with an angle formed by the first housing and the second housing based on a comparison of the first information and the second information, and
  provide a command to control the second processor based on the determined type of the movement of the electronic device and the determined arrangement state of the electronic device, and wherein the second processor is configured to perform a specified operation based on the command, wherein the first sensor comprises a first inertial sensor configured to detect movement corresponding to a plurality of axes, wherein the second sensor comprises a second inertial sensor configured to detect movement corresponding to at least the plurality of axes, wherein the first information comprises first sensing data corresponding to the plurality of axes detected by the first inertial sensor, wherein the second information comprises second sensing data corresponding to the plurality of axes detected by the second inertial sensor, and wherein, when first sensing data and first second sensing data about a first axis of the plurality of axes have a similarity of a first threshold value or greater and second first sensing data and second sensing data about a second axis have a symmetry of a second threshold value or greater, the first processor determines that the arrangement state of the electronic device is a folded state in which the first housing and the second housing form a first angle less than a predetermined angle.

14. The electronic device of claim 13, further comprising:

a main display disposed on a first surface of the housing across the first housing and the second housing; and an auxiliary display disposed on a second surface of the housing.

15. The electronic device of claim 13, wherein the first processor comprises a sensor hub, and wherein the second processor comprises an application processor (AP).

16. The electronic device of claim 13, wherein the type of the movement of the electronic device includes a lifting-up movement, and wherein the arrangement state of the electronic device includes at least one of an unfolded state, the folded state, or an intermediate state.

17. The electronic device of claim 13, wherein the specified operation includes activating the camera and performing user authentication.

* * * * *